US012727686B2

(12) United States Patent
Vukich et al.

(10) Patent No.: US 12,727,686 B2
(45) **Date of Patent: *Sep. 8, 2026**

(54) UTILIZING A MULTI-FUNCTION TRANSACTION CARD TO CAPTURE ITEM DATA AND ENABLE EXPEDITED CHECKOUT FOR PURCHASED ITEMS

(71) Applicant: Capital One Services, LLC, McLean, VA (US)

(72) Inventors: Adam Vukich, Springfield, VA (US); James Zarakas, Centreville, VA (US); Molly Johnson, Alexandria, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/218,895

(22) Filed: May 27, 2025

(65) Prior Publication Data

US 2025/0280971 A1 Sep. 11, 2025

Related U.S. Application Data

(63) Continuation of application No. 17/656,712, filed on Mar. 28, 2022, now Pat. No. 12,324,529, which is a (Continued)

(51) Int. Cl.

*A47F 9/04* (2006.01)
*B62B 5/00* (2006.01)

(Continued)

(52) U.S. Cl.

CPC ............ *A47F 9/048* (2013.01); *B62B 5/0069* (2013.01); *G06Q 20/18* (2013.01); *G06Q 20/352* (2013.01);

(Continued)

(58) Field of Classification Search

CPC ...... G06Q 20/18; G06Q 20/352; G06Q 20/20; G06Q 20/327; G06Q 30/0223; A47F 9/048

See application file for complete search history.

(56) References Cited

U.S. PATENT DOCUMENTS

| | | | | |
|---|---|---|---|---|
| 11,297,958 | B2 * | 4/2022 | Vukich | ................ G06Q 20/352 |
| 12,324,529 | B2 * | 6/2025 | Vukich | ............. G06Q 30/0234 |

OTHER PUBLICATIONS

Prosecution history of U.S. Appl. No. 17/656,712, filed Mar. 28, 2022.

* cited by examiner

*Primary Examiner* — Christle I Marshall
(74) *Attorney, Agent, or Firm* — Harrity & Harrity, LLP

(57) ABSTRACT

A multi-function transaction card may receive, from shelf sensors, first data indicating that items have been removed from shelves by a customer of a merchant, and may receive, from shopping cart sensors, second data indicating that the items have been placed in a shopping cart. The multi-function transaction card may receive, based on the first data and the second data, item data identifying the items placed in the shopping cart, wherein the item data is received from price tags of the items. The multi-function transaction card may store the item data, and may provide, to a transaction terminal of the merchant, the item data identifying the items and customer data identifying the customer. The multi-function transaction card may receive, from the transaction terminal, transaction data identifying a transaction that charges the multi-function transaction card for a total cost of the items.

20 Claims, 12 Drawing Sheets

Related U.S. Application Data continuation of application No. 16/884,697, filed on May 27, 2020, now Pat. No. 11,297,958.

(51) Int. Cl.

| | |
|---|---|
| ***G06Q 20/18*** | (2012.01) |
| ***G06Q 20/34*** | (2012.01) |
| ***G06Q 30/0207*** | (2023.01) |
| ***G06Q 30/0234*** | (2023.01) |
| ***G06Q 30/0279*** | (2023.01) |

(52) U.S. Cl.

CPC ..... *G06Q 30/0223* (2013.01); *G06Q 30/0234* (2013.01); *G06Q 30/0279* (2013.01)

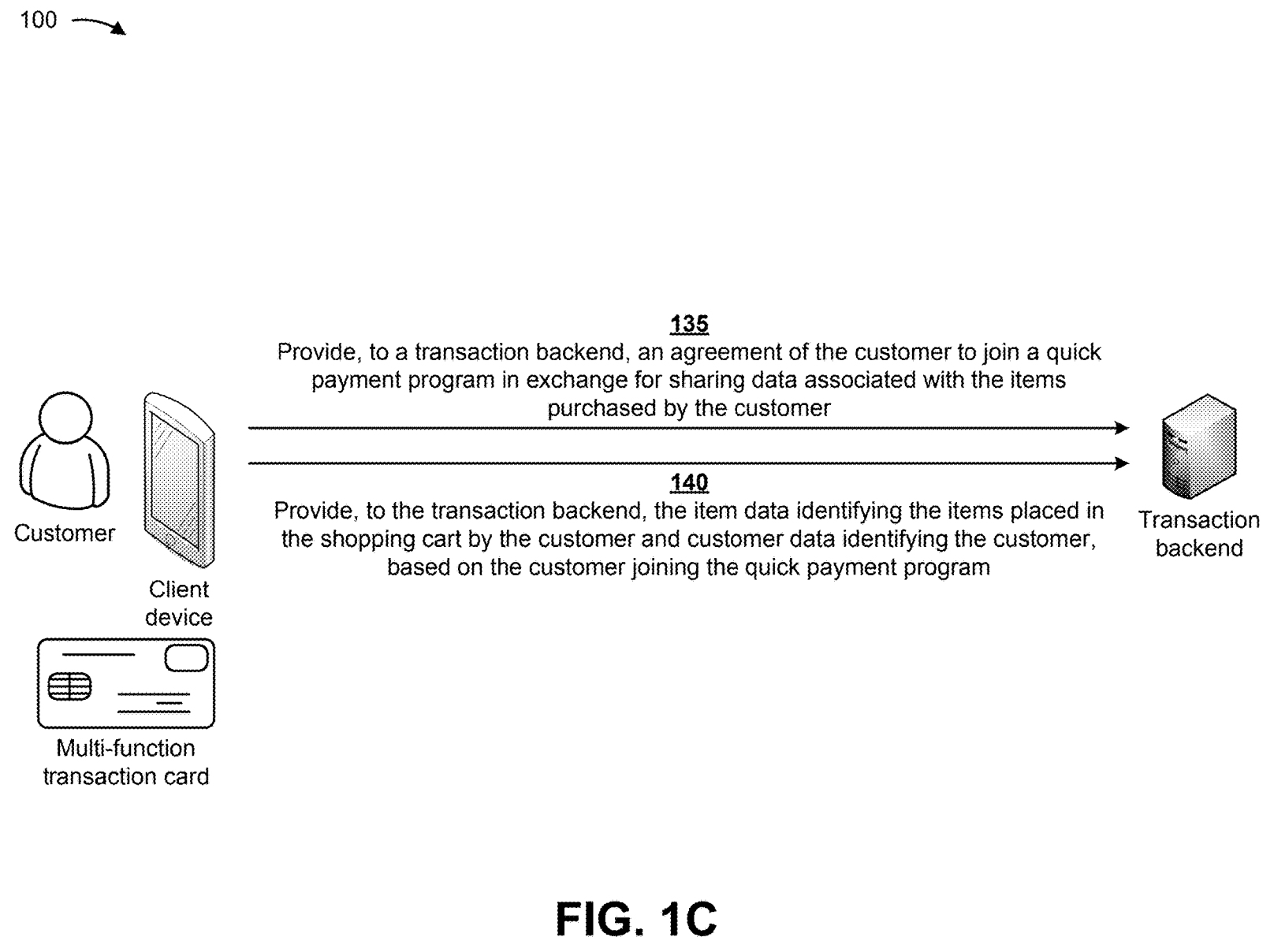

100

Customer

Client device

Multi-function transaction card

Transaction backend

135

Provide, to a transaction backend, an agreement of the customer to join a quick payment program in exchange for sharing data associated with the items purchased by the customer

140

Provide, to the transaction backend, the item data identifying the items placed in the shopping cart by the customer and customer data identifying the customer, based on the customer joining the quick payment program

FIG. 1C

UTILIZING A MULTI-FUNCTION TRANSACTION CARD TO CAPTURE ITEM DATA AND ENABLE EXPEDITED CHECKOUT FOR PURCHASED ITEMS

RELATED APPLICATION

This application is a continuation of U.S. patent application Ser. No. 17/656,712, filed Mar. 28, 2022, which is a continuation of U.S. patent application Ser. No. 16/884,697, filed May 27, 2020 (now U.S. Pat. No. 11,297,958), which are incorporated herein by reference in their entireties.

BACKGROUND

In inventory management, a stock keeping unit (SKU) identifies a type of item for sale (e.g., a product or a service) and attributes associated with the item type that distinguish the item type from other item types. For example, attributes for a product may include a manufacturer of product, a description of the product, a material utilized in the product, a size of the product, a color of the product, packaging utilized for the product, warranty terms for the product, and/or the like.

SUMMARY

According to some implementations, a method may include receiving, from shelf sensors, first data indicating that items have been removed from shelves by a customer of a merchant, and receiving, from shopping cart sensors, second data indicating that the items have been placed in a shopping cart by the customer. The method includes receiving, based on the first data and the second data, item data identifying the items placed in the shopping cart by the customer, wherein the item data may be received from price tags of the items and via wireless communications with the price tags. The method may include storing the item data, and providing, to a transaction terminal of the merchant, the item data identifying the items placed in the shopping cart by the customer and customer data identifying the customer. The method may include receiving, from the transaction terminal, transaction data identifying a transaction that charges a multi-function transaction card for a total cost of the items and a receipt for the transaction.

According to some implementations, a multi-function transaction card may include one or more memories, and one or more processors to receive, from a shelf sensor, first data indicating that an item has been removed from a shelf by a customer of a merchant, and receive, from a shopping cart sensor, second data indicating that the item has been placed in a shopping cart by the customer. The one or more processors may receive, based on the first data and the second, item data identifying the item placed in the shopping cart by the customer, wherein the item data may be received from a price tag of the item and via a wireless communication with the price tag. The one or more processors may store the item data in the one or more memories, and may transmit, to a transaction terminal of the merchant, the item data identifying the item placed in the shopping cart by the customer and customer data identifying the customer, wherein transmission of the item data and the customer data to the transaction terminal causes the transaction terminal to complete a transaction involving the item. The one or more processors may receive, from the transaction terminal, an indication that the transaction has been completed, and may delete the item data from the one or more memories based on the indication.

According to some implementations, a non-transitory computer-readable medium may store one or more instructions that, when executed by one or more processors of a multi-function transaction card, may cause the one or more processors to receive, from shelf sensors, first data indicating that items have been removed from shelves by a customer of a merchant, and receive, from shopping cart sensors, second data indicating that the items have been placed in a shopping cart by the customer. The one or more instructions may cause the one or more processors to receive, based on the first data and the second data, item data identifying the items placed in the shopping cart by the customer, wherein the item data may be received from price tags of the items and via wireless communications with the price tags. The one or more instructions may cause the one or more processors to store the item data, and provide, to a transaction terminal of the merchant, the item data identifying the items placed in the shopping cart by the customer and customer data identifying the customer. The one or more instructions may cause the one or more processors to receive, from the transaction terminal, transaction data identifying a transaction that charges the multi-function transaction card for a total cost of the items and a receipt for the transaction. The one or more instructions may cause the one or more processors to provide, to a transaction server device and via a client device, the item data identifying the items placed in the shopping cart by the customer and the customer data identifying the customer, based on the customer joining a quick payment program.

BRIEF DESCRIPTION OF THE DRAWINGS

FIGS. 1A-1G are diagrams of one or more example implementations described herein.

DETAILED DESCRIPTION

Figure 1A:
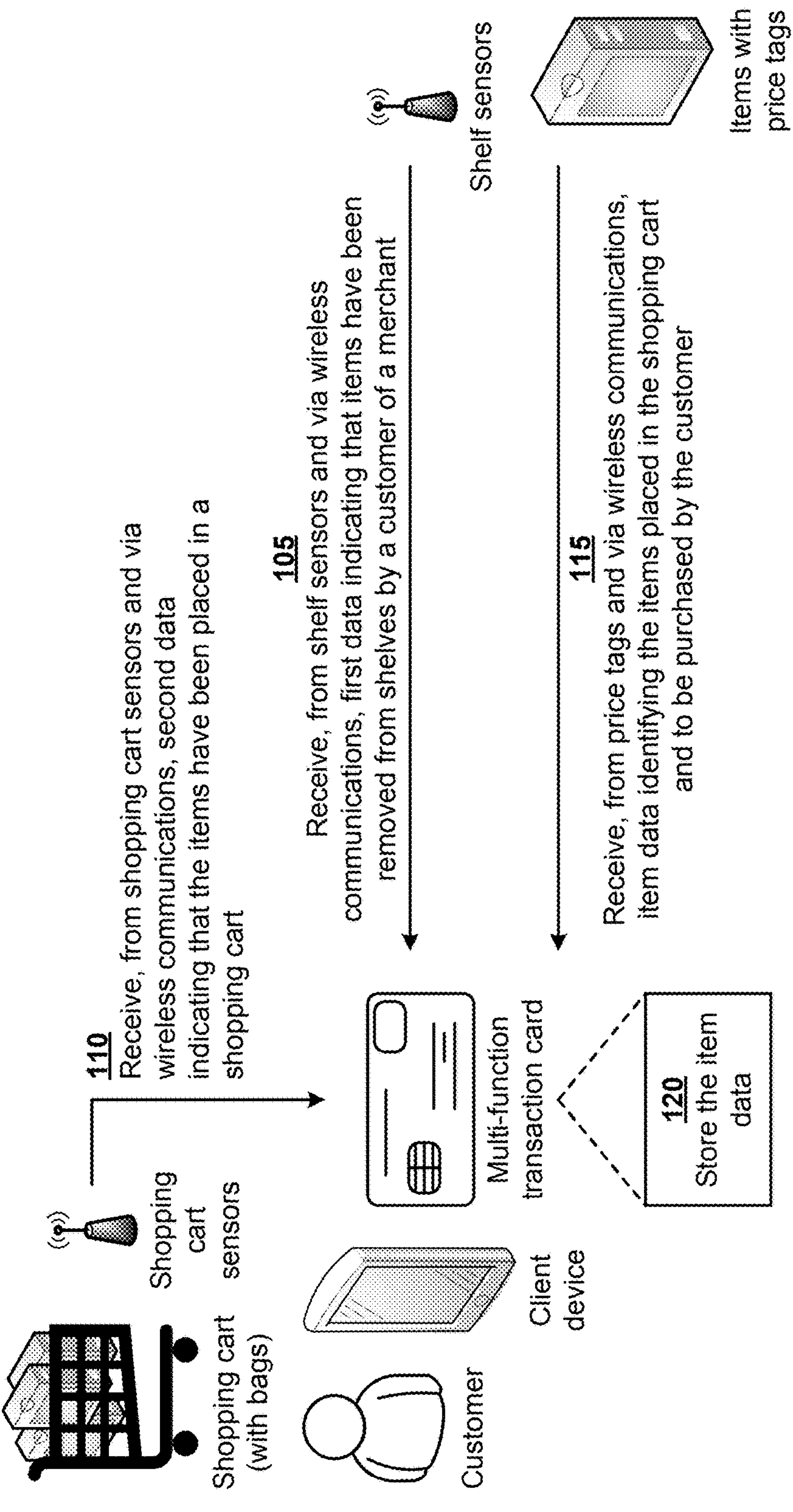

The following detailed description of example implementations refers to the accompanying drawings. The same reference numbers in different drawings may identify the same or similar elements.

When a customer purchases items from a merchant, a point-of-sale (PoS) device of the merchant may be utilized to scan the purchased items and complete a transaction for the purchased items. However, transaction data for the transaction associated with the purchased items does not typically provide item-level data (e.g., SKU data) associated with the purchased items. Rather, the transaction data typically includes only names of the items, prices of the items, and a merchant identifier. Furthermore, a checkout process via a PoS device is time consuming, tedious, and requires scanning each item individually. Thus, current techniques may waste computing resources (e.g., processing resources, memory resources, communication resources, and/or the like), networking resources, human resources, and/or the like associated with attempting to identify item-level data (e.g., SKU data) associated with the purchased items, scanning purchased items individually, waiting in a checkout line, and/or like.

Some implementations described herein provide a multi-function transaction card that captures item data and enables expedited checkout for purchased items. For example, the multi-function transaction card may receive, from shelf sensors, first data indicating that items have been removed from shelves by a customer of a merchant, and may receive, from shopping cart sensors, second data indicating that the items have been placed in a shopping cart by the customer. The multi-function transaction card may receive, based on the first data and the second data, item data identifying the items placed in the shopping cart by the customer, where the item data may be received from price tags of the items and via wireless communications with the price tags. The multi-function transaction card may store the item data, and may provide, to a transaction terminal of the merchant, the item data identifying the items placed in the shopping cart by the customer and customer data identifying the customer. The multi-function transaction card may receive, from the transaction terminal, transaction data identifying a transaction that charges the multi-function transaction card for a total cost of the items and a receipt for the transaction.

In this way, the multi-function transaction card captures item data and enables expedited checkout for purchased items in near-real time (e.g., while a customer is shopping for items at a store of a merchant). For example, a customer may utilize the multi-function transaction card to wirelessly communicate with price tags of items and to receive item data. The multi-function transaction card may wirelessly communicate the item data to a mobile device of the customer, and the mobile device and/or the multi-function transaction card may provide the item data to a transaction backend. The transaction backend may automatically charge the multi-function transaction card for purchase of the items (e.g., so that the customer does not need to checkout). This, in turn, conserves computing resources, networking resources, human resources and/or the like that would have otherwise been wasted in attempting to identify item-level data (e.g., SKU data) associated with the purchased items, scanning purchased items individually, waiting in a checkout line, and/or like.

FIGS. 1A-1G are diagrams of one or more example implementations 100 described herein. As shown in FIG. 1A, a client device may be associated with a multi-function transaction card and a customer purchasing items from a merchant. The client device may include a mobile device, a computer, and/or the like associated with the customer. The multi-function transaction card may include a credit card, a debit card, a rewards card, a prepaid card, and/or the like associated with the customer.

The multi-function transaction card may include a card body having dimensions that are in accordance with a standard. In some implementations, the multi-function transaction card is implemented in a form factor that is in accordance with a standard for transaction cards (e.g., International Organization for Standardization/International Electrotechnical Commission (ISO/IEC) 7810 ID-1). In some implementations, the card body may have dimensions that are in accordance with a standard that is associated with payment cards (e.g., credit cards, debit cards, and/or the like)—e.g., ISO/IEC 7810 ID-1 (e.g., a card body having a size of 85.60 millimeters×53.98 millimeters (3.370 inches×2.125 inches) and rounded corners with a radius of 2.88 millimeters to 3.48 millimeters).

As shown in FIG. 1A, the multi-function transaction card may include, among other components (e.g., as described elsewhere herein), a controller, a sensor, a secure element, a near field communication (NFC) element, and/or an output device. In some implementations, the multi-function transaction card may include a processor, such as a microcontroller that is capable of executing application logic. In some implementations, the secure element may be included in a transaction integrated circuit (IC) chip (e.g., a EUROPAY®, MASTERCARD®, VISA® (EMV) chip).

As described in more detail below, the multi-function transaction card may be capable of functioning as both a transaction card reader (e.g., a reader that reads other transaction cards, such as payment cards (e.g., credit cards, debit cards, other multi-function transaction cards, and/or the like), to receive payments), and as a payment card (e.g., a card that submits payments to other transaction card readers, such as transaction terminals, client devices, and/or other multi-function transaction cards). In some implementations, the multi-function transaction card may include application logic (e.g., stored in memory in the secure element), such as EMV-based application logic, configured to process card data received from contactless transaction cards, and application logic (e.g., also stored in memory in the secure element) configured to provide card data to transaction terminals for processing. Thus, a user of the multi-function transaction card may, at times, act as a merchant and accept payments from a customer's contactless transaction card and, at other times, act as a customer to submit payments using the multi-function transaction card.

The merchant may be a provider of goods and/or services. In some implementations, the customer may visit a store (e.g., a physical retail location, brick-and-mortar building, and/or the like) associated with the merchant to purchase one or more items (e.g., one or more goods and/or one or more services) offered for sale by the merchant. The merchant may display one or more items offered for sale by the merchant. The merchant may display the one or more items on one or more shelves associated with the store associated with the merchant. As referred to herein, a shelf may be any display capable of holding items, such as a stocking shelf, a wall shelf, an item display, a table display, a merchandise display, a cardboard display, a PoS display, a window display, a hook, a basket, a plate, and/or the like.

Each shelf, of the one or more shelves associated with the store associated with the merchant, may include one or more shelf sensors. A shelf sensor may be a sensor that is capable of determining when an item is removed from the shelf. For example, a shelf sensor may be a weight sensor, a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a pressure sensor, and/or the like. In some implementations, a shelf sensor may be arranged on, near, and/or directed at a shelf such that the shelf sensor corresponds to a particular item or a subset group of a particular item. In some implementations, a shelf sensor may be arranged on, near, and/or directed at a shelf such that the shelf sensor corresponds to all the items included on the shelf or all the items included on a subset of the shelf.

The customer may collect, store, and/or place the one or more items, which the customer is interested in purchasing, in a shopping cart after removing the one or more items from one or more shelves. As referred to herein, a shopping cart may be any carrier capable of containing one or more items, such as a push cart, a pull cart, a shopping trolley, a grocery cart, a basket, a bag, a hand cart, a buggy cart, a lumber cart, a flatbed cart, a platform truck, a motorized cart, an electric cart, a riding cart, and/or the like.

The shopping cart may include one or more bags to place items in. The bags may be containers for holdings one or more items. The bags may be reusable shopping cart bags, plastic bags, paper bags, hand-held bags, and/or the like. The shopping cart may include bags that may be filled as the customer shops. In this way, there is no need for bagging of items placed in the shopping cart at the time of checkout.

The shopping cart may include one or more shopping cart sensors. A shopping cart sensor may be a sensor capable of determining when one or more items are placed in the shopping cart. For example, a shopping cart sensor may be a weight sensor, a location sensor (e.g., a GPS receiver, a LPS device (e.g., that uses triangulation, multi-lateration, etc.), and/or the like), a gyroscope (e.g., a MEMS gyroscope or a similar type of device), an accelerometer, a speed sensor, a motion sensor, an infrared sensor, a pressure sensor, and/or the like.

As further shown in FIG. 1A, and by reference number 105, the multi-function transaction card may receive, from one or more shelf sensors and via wireless communications (e.g., Bluetooth communications, NFC communications, cellular communications, radio communications, and/or the like), first data indicating that one or more items have been removed from one or more shelves by the customer of the merchant. In some implementations, the one or more shelf sensors may transmit, via a wireless communication, the first data to the client device associated with the customer. In some implementations, the first data may indicate a quantity of items that have been removed from the one or more shelves. For example, a customer may remove a plurality of the same item from a shelf. The shelf sensor may determine the number of items removed from the shelf and include the number of items in the first data.

In some implementations, the one or more shelf sensors may determine an attribute (e.g., weight, dimensions, and/or the like) associated with an item. The one or more shelf sensors may detect a change in the attribute associated with an entire shelf. For example, if the attribute is associated with weight, the one or more shelf sensors may determine the weight of all the items included on the shelf. The one or more shelf sensors may detect and/or detect a change in the weight of all the items included on the shelf. The one or more shelf sensors may determine that the change in the weight corresponds to a particular item based on matching the change in the weight to the weight of the particular item. As such, the one or more shelf sensors may determine that the particular item has been removed from the shelf.

In some implementations, each item located on a shelf may include an item sensor. The item sensor may store item data associated with the item. The one or more shelf sensors may determine that a particular item has been removed from the shelf by detecting a movement of the item sensor associated with the particular item.

In some implementations, the one or more shelf sensors may be associated with a plurality of the same type of item (e.g., a plurality of the same item) included on a shelf. The one or more sensors may detect a change in an attribute associated with the item to determine that one or more items have been removed from the shelf. The one or more shelf sensors may determine the weight corresponding to one of the items and the weight corresponding to all of the items included on a shelf. The one or more shelf sensors may detect a change in weight of all of the items included on a shelf. The one or more shelf sensors may determine that the change in weight of all of the items included corresponds to one or more of the items being removed from the shelf. For example, the one or more shelf sensors may determine that an item weighs one kilogram. The one or more shelf sensors may determine that the total weight of a plurality of the item on a shelf is ten kilograms (e.g., there are ten of the same items on the shelf). The one or more shelf sensors may detect a change in the total weight of the plurality of the items on the shelf, such that the total weight is now eight kilograms (e.g., a loss of two kilograms). The one or more shelf sensors may determine, based on the loss of two kilograms from the total weight of the plurality of the items on the shelf, that two of the same items were removed from the shelf (e.g., based on each item weighing one kilogram each and the total loss of two kilograms). In some implementations, a similar process may be applied to other attributes corresponding to one or more items that the one or more shelf sensors detect and/or sense.

In some implementations, the one or more shelf sensors may determine that the first data is to be sent to the multi-function transaction card based on a location of the multi-function transaction card. For example, the one or more shelf sensors may determine that the multi-function transaction card is located proximate to (or satisfying a threshold distance from) the shelf from which one or more items have been removed. In some implementations, the one or more shelf sensors may send the first data to the multi-function transaction card based on the shelf sensors establishing a wireless communication with the multi-function transaction card. In some implementations, the one or more shelf sensors may send the first data to the multi-function transaction card based on an interaction (e.g., a physical interaction, such as a tap, a swipe, and/or the like, an NFC interaction, and/or the like) between the multi-function transaction card and the one or more shelf sensors and/or an interaction between the multi-function transaction card and a price tag (e.g., a price tag configured for wireless communication) associated with the item removed from the shelf.

In some implementations, the first data may include one or more attributes associated with the one or more items removed from the one or more shelves. The one or more attributes may be an attribute that is capable of being detected by the one or more shopping cart sensors of the shopping cart associated with the customer. For example, an attribute may be a weight of an item, a dimension of an item, a size of an item, a color of an item, a shape of an item, and/or the like.

In some implementations, the multi-function transaction card may output (e.g., via an output device, such as an electronic ink display, an LED display, and/or the like) an indication to the customer that the multi-function transaction card has received the first data. In some implementations, the multi-function transaction card may transmit an indication to the client device associated with the customer that the multi-function transaction card has received the first data. Based on the indication to the customer that the multi-function transaction card has received the first data, the customer may correct and/or remove any first data from the multi-function transaction card associated with one or more items that the customer did not remove from one or more shelves and/or associated with one or more items that the customer returned to the one or more shelves. In some implementations, a customer may provide an input to the multi-function transaction card and/or the client device that the customer has placed one or more removed items back on the shelf. Based on the input from the customer and/or confirmation from one or more shelf sensors associated with the first data that one or more items have been placed back on the shelf, the multi-function transaction card may remove the first data from the multi-function transaction card. In this way, the multi-function transaction card and/or the client device are able to conserve computing resources and/or network resources that would have otherwise been used completing a transaction associated with one or more items that the customer did not remove from the shelf, identifying the incorrect transaction, notifying the merchant, and/or remedying the incorrect transaction.

As further shown in FIG. 1A, and by reference number 110, the multi-function transaction card may receive, from one or more shopping cart sensors and via a wireless communication, second data indicating that the one or more items removed by the customer from the one or more shelves have been placed in a shopping cart associated with the customer. In some implementations, the one or more shopping cart sensors may transmit the second data to the client device associated with the customer. In some implementations, the multi-function transaction card and/or the client device may transmit the first data to the one or more shopping cart sensors of the shopping cart associated with the customer when the multi-function transaction card and/or the client device receives the first data.

The one or more shopping cart sensors may determine that the one or more items identified in the first data have been placed in the shopping cart based on information (e.g., one or more attributes associated with the one or more items) included in the first data. The shopping cart sensors may detect the one or more attributes associated with the one or more items and determine that the one or items have been placed in the shopping cart. For example, the first data may indicate that a first item has an attribute that is a weight of one kilogram. The one or more shopping cart sensors may detect that a weight of one kilogram is added to the shopping cart. Based on the detection that the weight of one kilogram was added, the one or more shopping cart sensors may determine that a single item (that was identified in the first data as having a weight of one kilogram) was added to the shopping cart.

In some implementations, the one or more shopping cart sensors may determine that the one or more items have been placed in the shopping cart by detecting the item sensor associated with the one or more items. The shopping cart sensor may determine the particular item placed in the shopping cart by receiving, from the item sensor associated with the particular item, item data associated with the particular item.

In some implementations, the one or more shopping cart sensors may determine that the one or more items identified in the first data have been placed in the shopping cart based on a detection that is not associated with the information included in the first data. For example, the one or more shopping cart sensors may detect a motion, a weight, a movement, and/or the like associated with something being placed in the shopping cart. The one or more shopping cart sensors may transmit, via a wireless connection, the second data including an indication to the multi-function transaction card that an object has been added to the shopping cart. In some implementations, the second data may include an attribute associated with the object added to the shopping cart. The multi-function transaction card may determine, based on the first data and the second data, what item(s) have been added to the shopping cart. For example, the first data may indicate that a customer has removed two items from one or more shelves: Item A, having a weight of one pound; and Item B having a weight of two pounds. The second data may indicate that an item having a weight one two pounds has been added to the shopping cart. As such, the multi-function transaction card may determine that Item B, and not Item A, has been added to the shopping cart. The multi-function transaction card may follow a similar process based on different attributes associated with one or more items to determine what items have been added to a shopping cart associated with the customer.

In some implementations, a customer may associate a shopping cart with the customer based on an interaction between one or more shopping cart sensors and the multi-function transaction card and/or an interaction between one or more shopping cart sensors and the client device associated with the customer. For example, a shopping cart may be associated with a customer based on a pairing, via a wireless connection, of the multi-function transaction card with one or more shopping cart sensors associated with the shopping cart and/or a pairing, via a wireless connection, of the client device associated with the customer with one or more shopping cart sensors associated with the shopping cart. In some implementations, a shopping cart may be associated with a customer based on an NFC interaction between the one or more shopping cart sensors associated with the shopping cart and the multi-function transaction card and/or an NFC interaction between the one or more shopping cart sensors associated with the shopping cart and the client device associated with the customer.

In some implementations, the multi-function transaction card may output (e.g., via an output device, such as an electronic ink display, an LED display, and/or the like) an indication to the customer that the multi-function transaction card has received the second data. In some implementations, the multi-function transaction card may transmit an indication to the client device associated with the customer that the multi-function transaction card has received the second data. Based on the indication to the customer that the multi-function transaction card has received the second data, the customer may correct and/or remove any second data from the multi-function transaction card associated with one or more items that the customer did not place in the shopping cart associated with the customer. In some implementations, the customer may provide an input to the multi-function transaction card and/or the client device that the customer has placed one or more removed items back on the shelf and/or removed one or more items from the shopping cart. Based on the input from the customer and/or confirmation from one or more shopping cart sensors associated with the second data that one or more items have been removed from the shopping cart, the multi-function transaction card may remove the second data from the multi-function transaction card. In this way, the multi-function transaction card and/or the client device are able to conserve computing resources and/or network resources that would have otherwise been used completing a transaction associated with one or more items that the customer did not place in the shopping cart, identifying the incorrect transaction, notifying the merchant, and/or remedying the incorrect transaction.

As further shown in FIG. 1A, and by reference number 115, the multi-function transaction card may receive, via wireless communications from one or more price tags associated with the one or more items placed in the shopping cart, item data identifying the items placed in the shopping cart and to be purchased by the customer. The one or more price tags may have wireless communication (e.g., Bluetooth communication, NFC communication, cellular communication, radio communication, and/or the like) capabilities. A price tag may be associated with an item. The price tag may include the item data related to the item the price tag is associated with. Item data may identify a stock keeping unit (SKU) of the item, a manufacturer of the item, a description of the item, a material of the item, a size of the item, a color of the item, a package associated with the item, a warranty term associated with the item, a price of the time, a promotion and/or rebate offered by the merchant for the item, whether the item is associated with an age restriction or other purchase restriction, and/or the like.

In some implementations, the price tag may transmit the item data to the multi-function transaction card based on the multi-function transaction card receiving the first data and the second data. For example, the multi-function transaction card may receive the item data if the customer has removed an item associated with the item data from the shelf (e.g., the first data) and placed the item in the shopping cart associated with the customer (e.g., the second data). In some implementations, the price tag may transmit the item data to the multi-function transaction card based on an interaction between the multi-function transaction card and the price tag and/or an interaction between the client device and the price tag. The interaction may be an NFC interaction, a physical interaction (e.g., a tap, a swipe, a touch, and/or the like), and/or the like. In some implementations, the price tag may transmit, via a wireless connection, the item data to the client device associated with the customer.

In some implementations, the multi-function transaction card (e.g., via the output device) and/or the client device may provide an indication to the customer that item data associated with one or more items has been received by the multi-function transaction card. The indication that item data associated with one or more items has been received may identify the one or more items associated with the item data and/or identify some, or all, of the item data. The customer, based on the indication, may verify the accuracy of the items and the item data. In this way, the multi-function transaction card and/or the client device are able to conserve computing resources and/or network resources that would have otherwise been used completing a transaction associated with one or more items that the customer did not place if the shopping cart or that had incorrect item data, identifying the incorrect transaction, notifying the merchant, and/or remedying the incorrect transaction.

As further shown in FIG. 1A, and by reference number 120, the item data may be stored by the multi-function transaction card in one or more memories. In some implementations, the multi-function transaction card may store the item data if the first data and the second data are received by the multi-function transaction card. In some implementations, the multi-function transaction card may store the item data in one or more memories included in the multi-function transaction card. In some implementations, the multi-function transaction card may store the item data in one or more memories associated with a cloud computing platform. In some implementations, the multi-function transaction card may store the item data in a data structure (e.g., a database, a table, a list, and/or the like) associated with the multi-function transaction card.

In some implementations, the multi-function transaction card may store the item data in response to receiving the item data from the price tag. In some implementations, the multi-function transaction card may store the item data in response to a user input verifying that the item data is accurate. In some implementations, the item data may be stored by the client device associated with the customer.

Figure 1B:
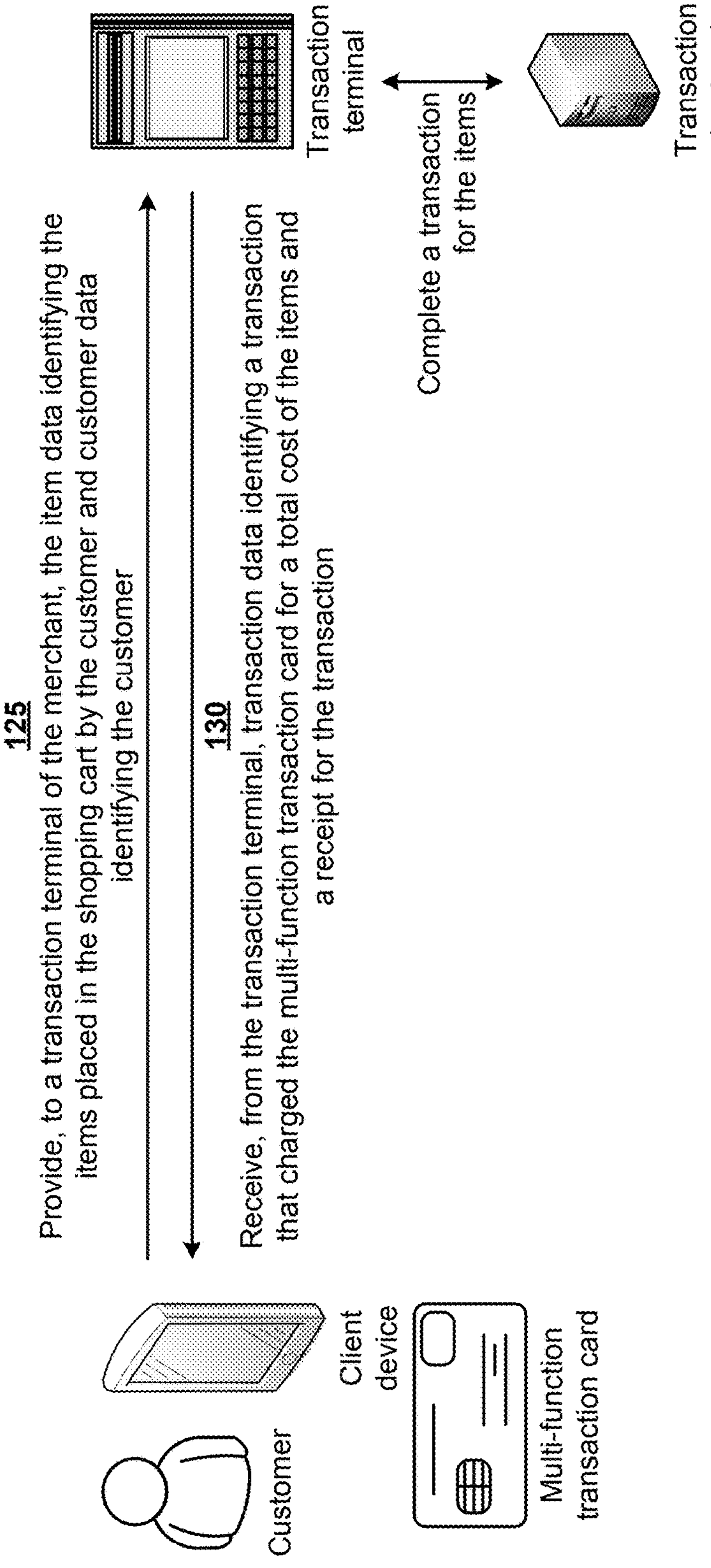

As shown in FIG. 1B, and by reference number 125, the multi-function transaction card may provide the item data associated with the items placed in the shopping cart by the customer and customer data identifying the customer to a transaction terminal associated with the merchant. In some implementations, the client device associated with the customer may provide the item data associated with the items placed in the shopping cart by the customer and customer data identifying the customer to the transaction terminal associated with the merchant.

The customer data identifying the customer may include a customer identifier (e.g., an identifier identifying an account of the customer with the merchant), a transaction account identifier (e.g., a bank account identifier, a credit account identifier, and/or the like), a multi-function transaction card identifier, and/or the like.

The transaction terminal may complete a transaction associated with the item data associated with the items placed in the shopping cart by the customer and the customer data identifying the customer by communicating with the transaction backend. The transaction backend may include one or more devices capable of authorizing and/or facilitating a transaction. For example, the transaction backend may include one or more servers and/or computers to store and/or provide information (e.g., authorizations, balances, transaction tokens, security information, account information, and/or the like) associated with processing a transaction via the transaction terminal.

In some implementations, the transaction terminal may determine a total cost for the transaction based on the item data and/or the customer data. For example, the transaction terminal may total the cost of each item identified in the item data to determine a total cost for the transaction. In some implementations, the transaction terminal may apply a discount and/or a rebate to a cost of one or more items, based on the customer data. In some implementations, the transaction terminal may apply a promotion to the cost of one or more items based on the item data and/or the customer data.

In some implementations, the multi-function transaction card and/or the client device may transmit the first data and/or the second data to the transaction terminal. The transaction terminal may use the first data and/or the second data to verify accuracy of the identified items placed in the shopping cart by the customer. In some implementations, the transaction terminal may include one or more transaction terminal sensors. A transaction terminal sensor may be a sensor capable of determining the items included in a shopping cart. For example, a transaction terminal sensor may be a weight sensor, a location sensor (e.g., a GPS receiver, a LPS device (e.g., that uses triangulation, multilateration, etc.), and/or the like), a gyroscope (e.g., a MEMS gyroscope or a similar type of device), an accelerometer, a speed sensor, a motion sensor, an infrared sensor, a pressure sensor, and/or the like.

The one or more transaction terminal sensors may detect one or more attributes associated with the one or more items contained in the shopping cart associated with the customer. The transaction terminal sensors may transmit the one or more detected attributes to the transaction terminal. The transaction terminal may compare the detected attribute to attributes contained in the first data associated with the customer, the second data associated with the customer, and/or the item data received by the transaction terminal from a multi-function transaction card associated with the customer. The transaction terminal may determine, based on the comparison, if the identification of the items in the shopping cart is accurate. For example, the one or more transaction terminal sensors may determine an actual weight for a shopping cart containing one or more items. The terminal may receive the actual weight and compare the total weight to an expected weight of the shopping cart (based on the known weights items identified as being in the shopping cart). If the actual weight is more than the expected weight, the transaction terminal may determine that there are additional items in the shopping cart that were not identified by the multi-function transaction card.

The transaction terminal may communicate the total cost for the transaction, the customer data, merchant data (e.g., data identifying the merchant, a transaction account associated with the merchant, and/or the like), the item data, and/or the like to the transaction backend to complete the transaction. The transaction backend may identify a transaction account associated with the customer based on the customer data. The transaction backend may determine that the transaction account associated with the customer includes sufficient resources (e.g., funds, credit, tokens, and/or the like) to complete the transaction. The transaction backend may cause funds (e.g., equal to the total cost of the transaction as identified by the transaction terminal) to be transferred from the transaction account associated with the customer to an account associated with the merchant. The transaction backend may communicate to the transaction terminal that the transaction was successfully completed. If the transaction backend determines that the transaction account associated with the customer does not include sufficient resources to complete the transaction, the transaction backend may communicate to the transaction terminal that the transaction was not successfully completed.

The transaction terminal may generate a receipt for the transaction if the transaction terminal receives an indication from the transaction backend that the transaction was successfully completed. The receipt may identify the items associated with the transactions, the total cost for the transaction, item data associated with items included in the transaction, the merchant associated with the transaction, the customer associated with the transaction, the date the transaction was completed, and/or the like.

In some implementations, the receipt may be a physical receipt. For example, the transaction terminal may print out the physical receipt. In some implementations, the receipt may be a digital receipt that is transmitted to the multi-function transaction card and/or transmitted to the client device by the transaction terminal. In some implementations, the digital receipt may be transmitted to an account (e.g., an email account, a messaging account, and/or the like) associated with the customer. In some implementations, the receipt may include a signature (e.g., a digital signature) indicating that the transaction has been completed for the items placed in the shopping cart of the customer.

In some implementations, the multi-function transaction card and/or the transaction terminal may determine a particular type of item to be purchased. For example, the multi-function transaction card may receive first data from one or more shelf sensors indicating the type of item, may receive second data from one or more shopping cart sensors indicating the type of item, and/or may receive item data from price tags indicating the type of item, as described above. In some implementations, the transaction terminal may receive the first data, the second data, and/or the item data from the multi-function transaction card. In some implementations, the transaction card and/or the transaction terminal may perform an action based on the type of item. For example, if the type of item is alcohol, tobacco, or another item type associated with an age restriction, then the transaction terminal may request identification from the customer, may notify a merchant associate (e.g., by turning on a light, emitting a sound, transmitting a message to a user device associated with the merchant associate, and/or the like), or may perform another action. If the transaction terminal receives information indicating that the age requirement is satisfied (e.g., based on scanning an identification card, receiving input from a merchant associate, or otherwise verifying the customer's age), then the transaction terminal may permit the purchase of the item.

In some implementations, the multi-function transaction card may include one or more output components, such as a screen, a display, one or more LEDs (e.g., multi-colored LEDs), and/or the like. The multi-function transaction card may output a particular pattern on the screen, the display, using the one or more LEDs, and/or the like, to indicate whether an age restriction associated with the item type is satisfied by the customer. For example, a cardholder (e.g., a customer) may be required to input a date of birth when applying for a transaction card, and this information may be stored via the card and/or output for display by the card. For example, an LED may be displayed with a first color (e.g., red) if the customer does not satisfy an age restriction, and may be displayed with a second color (e.g., green) if the customer satisfies the age restriction. In this way, a merchant associate can easily verify an age of the customer. Alternatively, the transaction terminal can scan and/or capture an image of the multi-function transaction card, and may determine whether to permit the transaction based on the output displayed by the transaction card. In some implementations, the transaction terminal may read a name on the transaction card and may capture an image of the customer to determine whether the person using the transaction card is the same as the cardholder. For example, the multi-function transaction card may store an image of the cardholder, and may provide the image to the transaction terminal to perform the verification (e.g., by comparing the image provided by the transaction card and another image of the customer captured by an image capture device associated with the transaction terminal).

In some implementations, the transaction terminal may communicate to one or more security devices associated with the store of the merchant. A security device may be a device that discourages an unauthorized customer (e.g., a customer who has not completed a transaction for the items in the shopping cart of the customer) from leaving the store. A security device may be a device that prevents a shopping cart associated with an unauthorized customer from leaving the store. A security device may be a device that outputs an alert (e.g., an audible alert, a visual alert, and/or the like) when the security device detects an unauthorized customer attempting to leave the store.

The security device may be a device that detects an item leaving the store. Each item in the store may include a device that the security device is capable of detecting. Additionally, or alternatively, the security device may detect an item leaving the store using a camera, a motion detector, a sensor, and/or the like.

In some implementations, the security device may receive and/or collect customer data (e.g., an identifier of a client device associated with the customer, an identifier of a multi-function transaction card associated with the customer, and/or the like) via a wireless communication when the security device detects an unauthorized customer attempting to leave the store. For example, a security device may be a sensor, an anti-theft detection system, a camera, an electronic article surveillance (EAS) system (e.g., an electro-magnetic EAS system, an acousto-magnetic EAS system, a radio frequency identification (RFID) EAS system, a microwave EAS system, and/or the like), a control system associated with the one or more shopping carts in the store (as explained in further detail below), and/or the like.

In some implementations, the transaction terminal may communicate with one or more security devices associated with the merchant when the transaction terminal receives the transaction data (e.g., indicating a transaction has been completed) from the transaction backend. The communication from the transaction terminal to one or more security devices associated with the merchant may inform the security device that the transaction has been completed. The communication from the transaction terminal to one or more security devices associated with the merchant may enable the customer to exit the store of the merchant. In some implementations, the one or more security devices associated with the merchant may sense the receipt, enabling the customer to exit the store.

In some implementations, the one or more shopping carts associated with the merchant may be autonomous shopping carts. An autonomous shopping cart may be a shopping cart that can be controlled and/or semi-controlled by a control system (e.g., a combination of cameras, sensors (e.g., location sensors (e.g., GPS receivers, LPS devices (e.g., that use triangulation, multi-lateration, and/or the like), and/or the like), computing devices, and/or the like associated with the autonomous shopping cart and/or associated with the merchant). The control system may be associated with the merchant. The control system may be associated with the one or more security devices associated with the merchant and/or associated with one or more transaction terminals located in the store. In some implementations, an autonomous shopping cart may be controlled by a client device associated with a customer who is using the autonomous shopping cart. The client device associated with the customer who is using the autonomous shopping cart may control the autonomous shopping cart only when the autonomous shopping cart is located within the store (e.g., the client device may not be able to direct the autonomous shopping cart to leave the store).

The autonomous shopping cart may follow the customer, based on signals from the control system, the client device associated with the customer, and/or the multi-function transaction card associated with the customer, as the customer moves throughout the store. For example, the customer may not have to physically move the autonomous shopping cart. The autonomous shopping cart may automatically move with the customer as the customer moves.

In some implementations, the control system of the autonomous shopping cart may receive the transaction data (e.g., indicating that a transaction has been completed for the items placed in the autonomous shopping cart). The autonomous shopping cart may exit the store and travel to a vehicle of the customer associated with the autonomous shopping cart based on the autonomous shopping cart receiving the transaction data. A location of the vehicle of the customer associated with the autonomous shopping cart may be received from the client device associated with the customer. In some implementations, the client device associated with the customer using the autonomous shopping cart may be permitted to direct the autonomous shopping cart to leave the store based on the control system receiving the transaction data. In some implementations, the transaction terminal may direct the autonomous shopping cart to leave the store after receiving the transaction data from the transaction backend.

As further shown in FIG. 1B, and by reference number 130, the multi-function transaction card may receive, from the transaction terminal, transaction data identifying that the transaction was charged to the multi-function transaction card for the total cost of the items that were placed in the shopping cart associated with the customer (e.g., an indication that the transaction has been completed). In some implementations, the client device associated with the customer may receive, from the transaction terminal, the transaction data identifying the transaction that was charged to the multi-function transaction card. In some implementations, the multi-function transaction card may provide the transaction data identifying the transaction that was charged to the multi-function transaction card to the client device associated with the customer.

In some implementations, based on receiving indication that the transaction has been completed, the multi-function transaction card associated with the transaction and/or the client device associated with the transaction may delete any first data, second data, and/or item data that has been stored by the multi-function transaction card and/or by the client device. Deleting the first data, second data, and/or item data that has been stored by the multi-function transaction card and/or by the client device may prevent a fraudulent actor from obtaining the first data, second data, and/or item data. In this way, the multi-function transaction card and/or the client device may conserve computing resources and/or network resources that would have otherwise been used identifying, reporting, and/or remedying a fraudulent act committed by the fraudulent actor.

The multi-function transaction card may receive, from the transaction terminal, the receipt (e.g., a digital receipt) for the transaction. In some implementations, the client device associated with the customer may receive, from the transaction terminal, the receipt for the transaction. In some implementations, the multi-function transaction card may provide the receipt for the transaction to the client device associated with the customer.

The receipt may enable the customer to exit the store without triggering one or more security devices associated with the store. For example, a security device may detect the receipt (e.g., from the multi-function transaction card and/or the client device). A customer attempting to exit the store with detected items, by the security device, in a shopping cart associated with the customer and no receipt detected, by the security device, may be determined to be an unauthorized customer by the security device. The security device may compare the transaction data in the receipt and compare the transaction data to the items contained in a shopping cart associated with the customer attempting to leave the store. For example, the security device may determine what items are placed in the shopping cart that is attempting to leave the store. The security device may compare the items determined to be in the shopping cart against the transaction data included in the receipt (e.g., to determine if each item placed in the shopping cart attempting to leave the store is identified in the transaction data in the receipt).

In some implementations, the security device may perform an action (e.g., output an alert, collect customer information from the multi-function transaction card associated with the customer and/or the client device associated with the customer, prevent a shopping cart associated with the customer (e.g., via autonomous control) from leaving the store, and/or the like) when the security device detects an unauthorized customer.

In some implementations, the security device may receive the first data, the second data, and/or the item data stored by the multi-function transaction card and/or stored by the client device. The security device may compare the first data, the second data, and/or the item data to the items determined to be in the shopping cart attempting to leave the store. If the security device determines there is not a match (e.g., the shopping cart contains an additional item not included in the first data, the second data, and/or the item data) the security device may determine that the customer associated with the shopping cart attempting to leave the store is an unauthorized customer.

In some implementations, the customer may obtain a physical receipt from the transaction terminal. For example, the transaction terminal may print a physical receipt associated with the completed transaction. The security device may detect the physical receipt (e.g., by scanning a machine-readable code (e.g., barcode, QR code, and/or the like) on the physical receipt) and receive the transaction data indicated on the physical receipt. The security device may compare the transaction data included on the physical receipt against the items detected in the shopping cart associated with the customer attempting to leave the store.

As such, the security device associated with the store may ensure that any unauthorized customers who leave the store are detected. As described above, the security device may obtain customer information (e.g., identifier associated with the multi-function transaction card of the unauthorized customer, identifier associated with the client device of the unauthorized customer, an identifier associated with an account of the customer, and/or the like) when the security device detects an unauthorized customer leaving the store. The security device may provide the customer information associated with an unauthorized customer to the merchant.

In some implementations, the security device may associate an unauthorized customer identifier with the customer information of the unauthorized customer. The security device may perform an action if the security device detects a customer entering the store that is associated with customer information that is associated with an unauthorized customer identifier (e.g., by detecting a multi-function transaction card associated with the customer, by detecting a client device associated with the customer, and/or the like).

In some implementations, the customer associated with the client device may interact with the client device to register for a quick payment program. The quick payment program may enable the customer to complete a transaction for items purchased from a merchant without the use of a transaction terminal associated with the merchant (e.g., via communication between the client device and the transaction backend). The quick payment program may be provided by a merchant, a provider of the multi-function transaction card, a third party, a financial institution, and/or the like. The provider of the quick payment program may be associated with a transaction backend. The transaction backend associated with the provider of the quick payment program may be the same transaction backend as described above or the transaction backend may be a different transaction backend that performs functions in a similar manner as the transaction backend described above.

The quick payment program may be offered in exchange for sharing data associated with the items purchased (e.g., program data) by the customer with the provider of the quick payment program. The program data may include item data (e.g., identifying a SKU of the item, a manufacturer of the item, a description of the item, a material of the item, a size of the item, a color of the item, a package associated with the item, a warranty term associated with the item, a price of the time, a promotion and/or rebate offered by the merchant for the item, and/or the like), transaction data, merchant data (e.g., merchant identifier, a transaction account identifier for a transaction account associated with the merchant, and/or the like), customer data (a multi-function transaction card identifier for the multi-function transaction card associated with the customer, a transaction account identifier for a transaction account associated with the customer, client device data associated with the client device of the customer, and/or the like), and/or the like.

The customer (via the client device and/or the multi-function transaction card) may share program data with the provider of the quick payment program each time the customer completes a transaction. In some implementations, the quick payment program may be accepted by one or more merchants. The customer may share program data with the provider of the quick payment program from each merchant that the customer completes a transaction with.

The customer may register for the quick payment program using the client device. For example, the customer may use the client device to interact with (e.g., view, fill, complete, and/or the like) a registration form. The registration form may be used to obtain or register for a quick payment program application associated with the quick payment program and the transaction backend. The registration form may be provided to the client device from the transaction backend. The registration form may be accessed by the client device via a webpage, an application (e.g., the quick payment program application), and/or the like. The customer may be prompted to input information into the registration form when initially opening or downloading the quick payment program application. Additionally, or alternatively, the customer may be prompted to input information into the registration form in real time using the quick payment program application.

In some implementations, the registration form may have fields for the customer to input information into. The fields may relate to registration information, account information (e.g., transaction account information associated with the customer), multi-function transaction card information, customer preferences, and/or the like. The fields identified above are intended as examples of information that may be requested by the registration form. In some implementations, the fields may relate to different information that may be useful for providing the quick payment program.

For example, the registration information may include fields for a customer name, a customer phone number, a customer transaction account identifier, credentials/login information (e.g., a user name and password), an email address, a home address, a multi-function transaction card identifier, and/or the like. Additionally, or alternatively, the registration information may include biometric information. The biometric information may be input by the customer (e.g., by a fingerprint scan, facial scan, and/or the like).

The registration form may also include an agreement (e.g., a legally binding agreement) indicating that the customer agrees to share program data with the provider of the quick payment program in exchange for registering with the quick payment program. A customer may opt in and agree to the agreement to register with the quick payment program.

As shown in FIG. 1C, and by reference number 135, the client device may provide, to the transaction backend associated with the provider of the quick payment program, the agreement of the customer to join the quick payment program in exchange for sharing data (e.g., program data) associated with the items purchased by the customer. The client device may provide the registration information associated with the customer to the transaction backend associated with the provider of the quick payment program. The agreement and/or the registration information may be stored by the transaction backend associated with the provider of the quick payment program.

In some implementations, one or more merchants may agree to participate in the quick payment program by registering with the quick payment program. A merchant may register with the quick payment program by indicating to the provider of the quick payment program that its customers may complete a transaction at a store of the merchant using the quick payment program. The merchant may provide merchant information (e.g., a merchant identifier, an identifier of a transaction account associated with a transaction account of the merchant, and/or the like) to the transaction backend associated with the provider of the quick payment program. The merchant information may be stored by the transaction backend associated with the provider of the quick payment program. The provider of the quick payment program may provide an indication to registered customers (e.g., via the quick payment program application on the client devices) of all the merchants who have agreed to participate in the quick payment program.

A customer may visit a store associated with a merchant who has agreed to participate in the quick payment program. The store associated with the merchant may be set up in a manner similar to the store described above with respect to FIGS. 1A and 1B (e.g., including items displayed on shelves having one or more shelf sensors, including one or more shopping carts having one or more shopping cart sensors, including one or more security devices, and/or the like). The sensors and/or devices (e.g., shelf sensors, shopping cart sensors, transaction terminal sensors, security devices, transaction terminals, and/or the like) associated with the store may operate in a manner similar to that as described above with respect to FIGS. 1A and 1B.

The multi-function transaction card associated with the customer may store the first data (e.g., indicating that items have been removed from shelves by the customer), the second data (e.g., indicating that items have been placed in a shopping cart by the customer), and/or the item data (e.g., identifying the items placed in the shopping cart by the customer). The multi-function transaction card may provide the first data, the second data, and/or the item data associated with items placed in a shopping cart by the customer to the client device (and/or the quick payment program application on the client device) associated with the customer.

As further shown in FIG. 1C, and by reference number 140, the client device (and/or the quick payment program application on the client device) may provide, to the transaction backend associated with provider of the quick payment program, the item data identifying the items placed in the shopping cart by the customer. Additionally, or alternatively, the client device (and/or the quick payment program application on the client device) may provide, to the transaction backend associated with provider of the quick payment program, customer data identifying the customer. The customer data may include a customer identifier that may be used by the transaction backend to determine the registration information associated with the customer.

The transaction backend may associate the item data with the customer data. The transaction backend may develop a customer profile associated with the customer and/or the customer data. The customer profile may include item data of items placed in a shopping cart by the customer, items purchased by the customer, customer preferences (e.g., preferences input by the customer, preferences determined based on the customer profile, and/or the like), merchants visited by the customer, and/or the like. The customer profile may be stored by the transaction backend. The customer profile may be updated each time the client device associated with the customer provides item data to the transaction backend.

In some implementations, the item data may be transmitted to the transaction backend each time the customer places an item in a shopping cart. In some implementations, item data may be transmitted to the transaction backend each time a customer visits and/or leaves a store associated with a merchant.

In some implementations, the transaction backend may group item data based on characteristics of the item data and/or customer data. For example, the transaction backend may group item data associated with a customer on a per-visit basis (e.g., a different group for each visit to a merchant), on a merchant basis (e.g., a different group including all item data associated with a merchant), and/or the like.

In some implementations, there may be hundreds, thousands, and/or the like, of client devices that produce thousands, millions, billions, and/or the like, of data points provided in the item data. In this way, the transaction backend may handle thousands, millions, billions, and/or the like, of data points within a period of time (e. g., daily, weekly, monthly), and thus may provide "big data" capability.

In some implementations, the transaction backend may store the item data and in a data structure (e.g., a database, a table, a list, and/or the like) associated with the transaction backend. The transaction backend may store the item data such that it cannot be connected with the customer (e.g., anonymized). The transaction backend may encrypt the item data and store only encrypted item data to protect the privacy of the customer associated with the item data.

In some implementations, the customer may opt-in to a fundraiser in a similar manner as described above in connection with opting-in to the quick payment program. For example, the customer may interact with a transaction card application executing on the client device and/or the multi-function transaction card to select an organization to support. If the customer interacts with the client device to provide such input, the client device may transmit information that identifies the organization to the multi-function transaction card (e.g., using NFC). The multi-function transaction card may communicate with the transaction terminal to transmit or receive information identifying the organization, and the transaction card and/or the transaction terminal may determine whether a merchant associated with the transaction terminal is associated with a fundraiser that supports the organization. Additionally, or alternatively, the client device may determine whether the client device is located in proximity of a merchant that supports the organization, such as using GPS, NFC, Bluetooth, and/or the like. The client device may indicate transmit an indication, to the transaction card, that the client device is located in proximity of a merchant that supports the organization. Additionally, or alternatively, the client device may output such an indication to the customer. When transacting with the merchant (e.g. via the transaction terminal) using the transaction card, the transaction card may notify the transaction terminal that the customer supports the organization, and may provide funds to participate in the fundraiser (e.g., with approval from the customer, which may include pre-approval prior to the transaction, user input via the client device at the time of the transaction, and/or the like).

Figure 1D:
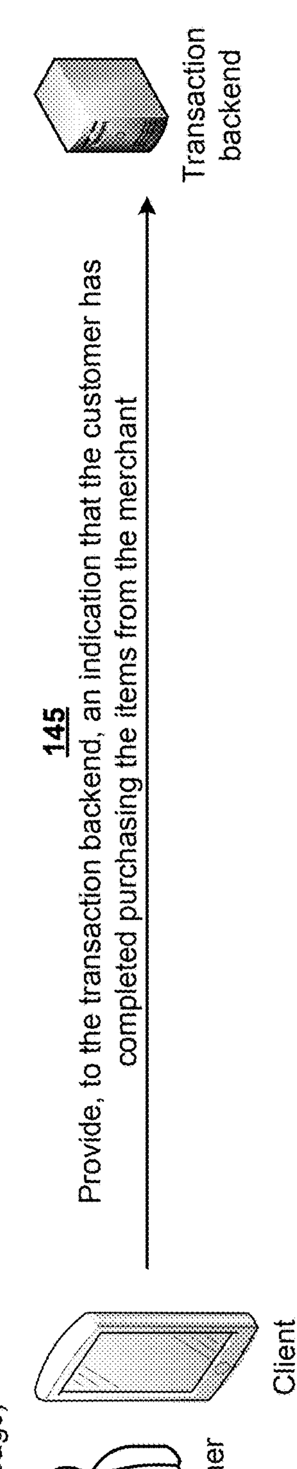
Figure 1D:

As shown in FIG. 1D, and by reference number 145, the customer, via an input to the client device and/or an input to the quick payment program application, may provide, to the transaction backend associated with the provider of the quick payment program, an indication that the customer has completed purchasing the items from the merchant. The customer may provide the indication when the customer has finished shopping and is ready to complete a transaction for the items in the shopping cart associated with the customer.

The indication that the customer has completed purchasing the items from the merchant may include the item data associated with the items in the shopping cart that the customer wants to purchase. For example, item data associated with an item that was placed in the shopping cart may have been sent to the transaction backend. However, the customer may have placed that item back on the shelf and does not wish to purchase the item. As such, the indication that the customer has completed purchasing the items from the merchant may include only item data for items the customer would like to purchase. In some implementations, the item data associated with the items placed in the shopping cart by the customer may not be transmitted to the transaction backed until the customer provides the indication that the customer has completed shopping for items from the merchant.

Figure 1E:
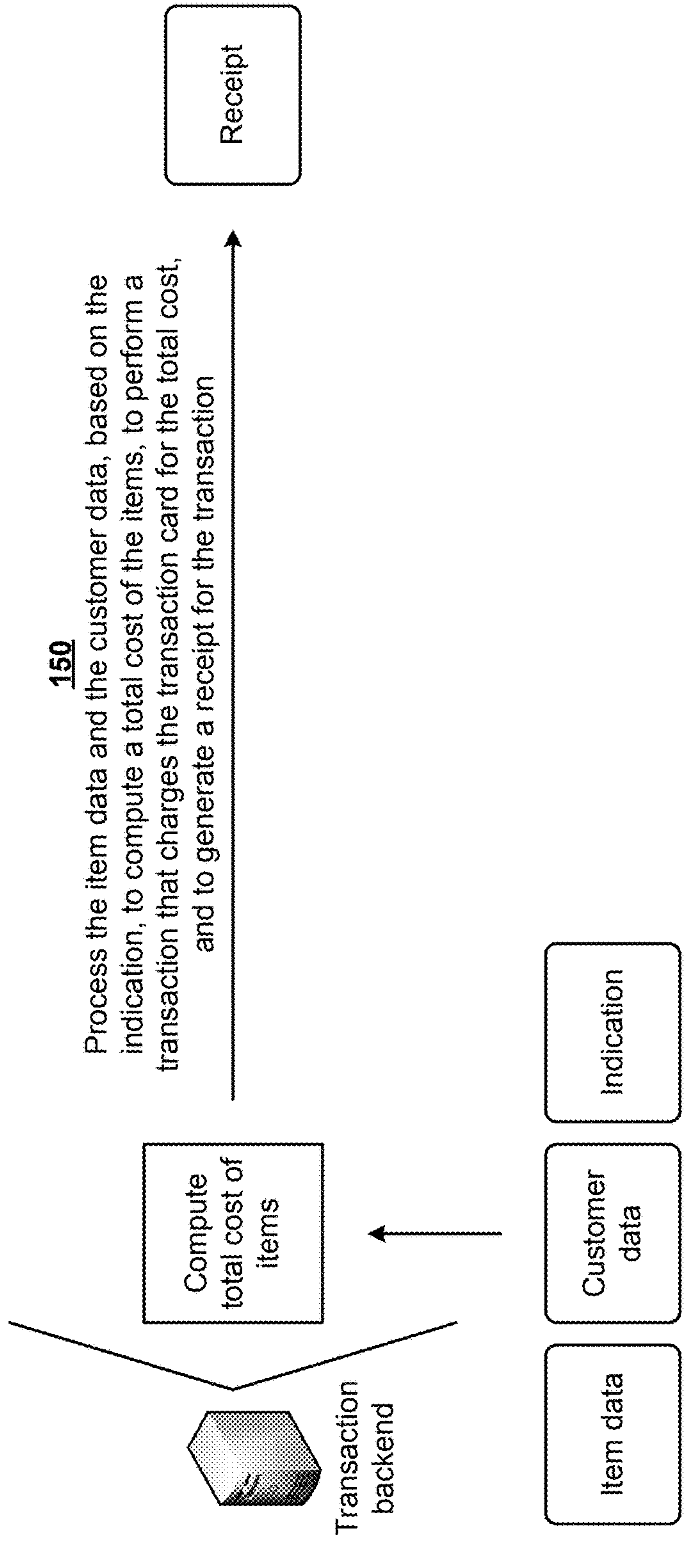

As shown in FIG. 1E, and by reference number 150, the transaction backend associated with the provider of the quick payment program may process the item data and the customer data, based on the indication that the customer has completed purchasing the items from the merchant, to compute a total cost of the items placed in the shopping cart by the customer. The transaction backend may compute the total cost of the items based on the item data of the items included in the shopping cart of the customer at the time the indication is sent to the transaction backend.

The transaction backend may compute the total cost of the items by determining a cost for each item, based on the item data associated with the item, and totaling the cost for all the items in the shopping cart of the customer. In some implementations, the transaction backend may determine additional costs (such as sales tax, additional fees, and/or the like) to be added to the total cost of the items based on the customer data and/or the merchant data. For example, the transaction backend may determine a location of the store where the customer is purchasing items based on the customer data and/or the merchant data. The transaction backend may determine (e.g., by accessing a data structure, by searching the internet, and/or the like) the appropriate additional costs to be added to the total cost of the items for the location.

In some implementations, the customer data and/or the item data may include promotional data associated with the customer, one or more items identified in the item data, the merchant, and/or the multi-function transaction card of the customer. The promotional data may include a discount to be applied to a cost of an item, a discount to be applied to the total cost of the transaction, and/or the like. The transaction backend may apply the promotional data when determining the total cost of the transaction (e.g., when completing the transaction, the backend may cause a discount to be applied to a cost of the item).

In some implementations, the quick payment program may be associated with a rewards program. The rewards program may provide reward points to a customer based on the customer using the quick payment program. For example, completing a transaction using the quick payment program may cause reward points to be applied to an account associated with the customer. In some implementations, completing a transaction using the quick payment program may cause reward points to be applied to the multi-function transaction card of the customer. Reward points may be redeemed by the customer for a discount on an item, a discount on a total cost of a transaction, a free item, a promotional item, an exclusive item, and/or the like.

In some implementations, the transaction backend may utilize the item data and/or the customer data to analyze a spending pattern associated with the customer. The spending pattern may be associated with a category of item (e.g., toothbrush, cereal, soft drink, toilet paper, and/or the like), a timing of a purchase, a timing of a purchase of a type of item, a brand of an item, a cost of a purchase, a cost of an item, and/or the like. The transaction backend may analyze a plurality of item data associated with the customer to determine one or more spending patterns associated with the customer. In some implementations, the one or more spending patterns may be determined using one or more machine learning models.

The transaction backend may use a spending pattern associated with the customer to make a recommendation to the customer. The recommendation may be a recommendation to make a purchase of a category of item typically purchased by the customer. For example, if a spending pattern associated with a customer determines that the customer typically purchases dish soap once per week (e.g., each Sunday), the transaction backend may provide a recommendation to the customer to purchase dish soap on a Sunday if the transaction backend determines that the customer has not purchased dish soap that week.

In some implementations, the transaction backend may receive a promotion associated with an item from a merchant (e.g., indicating that the item is on sale). The transaction backend may determine that, based on a spending pattern, that the customer typically purchases the item and/or an item related to the item. The transaction backend may provide a recommendation to the customer that indicates the promotion associated with the item from the merchant.

In some implementations, the recommendation may be based on the customer completing a transaction. For example, the recommendation may be related to one or more items that the customer is purchasing at that time. The transaction backend may determine that an item that the customer is purchasing is offered for sale at one or more different merchants. The transaction backend may compare the cost of the item the customer is purchasing to the cost of the item offered for sale by the one or more different merchants. If the transaction backend determines that the cost of the item offered for sale by a different merchant is less than the cost of the item the customer is purchasing, the transaction backend may provide a recommendation to the customer to purchase the item from the different merchant.

The transaction backend may determine related items to an item that the customer is purchasing. The related items may be offered for sale by the merchant associated with the store the customer is currently shopping in and/or may be offered for sale by a different merchant. The transaction backend may compare the cost of the item that the customer is purchasing to the cost of the related items. If the transaction backend determines that a cost of a related item is less than the cost of the item that the customer is purchasing, the transaction backend may provide a recommendation to purchase the less expensive related item.

In some implementations, the transaction backend may provide a promotion (e.g., a recommendation, a sale from a merchant, an offer from a merchant, and/or the like) for other items that are related (e.g., related items) to an item that the customer is purchasing, based on the customer completing a transaction. In some implementations, the transaction backend may determine a related item based on spending patterns of one or more other customers who provide item data to transaction backend (e.g., via the quick payment program). For example, the transaction backend may identify a pattern that indicates that an item is typically purchased with the item that the customer is purchasing. The transaction backend may determine that the item is typically purchased with the item that the customer is purchasing is a related item. The transaction backend may provide a promotion for the related item to the customer.

In some implementations, the customer may provide a final indication (e.g., via the quick payment program application on the client device associated with the customer) to complete the transaction. The final indication may be provided based on the customer receiving a recommendation, a promotion, and/or the like from the transaction backend.

The transaction backend may complete the transaction in the same (or similar) manner as described above with respect to the transaction backend. For example, the transaction backend may transfer resources (e.g., funds, credit, and/or the like) from an account associated with the customer to an account associated with the merchant. The transaction backend may charge a transaction account associated with the customer for the total cost of the transaction, as determined by the transaction backend. In some implementations, the transaction backend may charge the multi-function transaction card associated with the customer for the total cost of the transaction.

The transaction backend may determine that the transaction was successfully completed. The transaction backend may generate a receipt for the transaction. The receipt may be generated in the same (or similar) manner as described above. In some implementations, the receipt includes the same (or similar) information as described above. The receipt may be a digital receipt. In some implementations, the receipt includes additional information, such as a promotion, a recommendation, a reward point balance associated with a reward account of the customer, and/or the like.

Figure 1F:
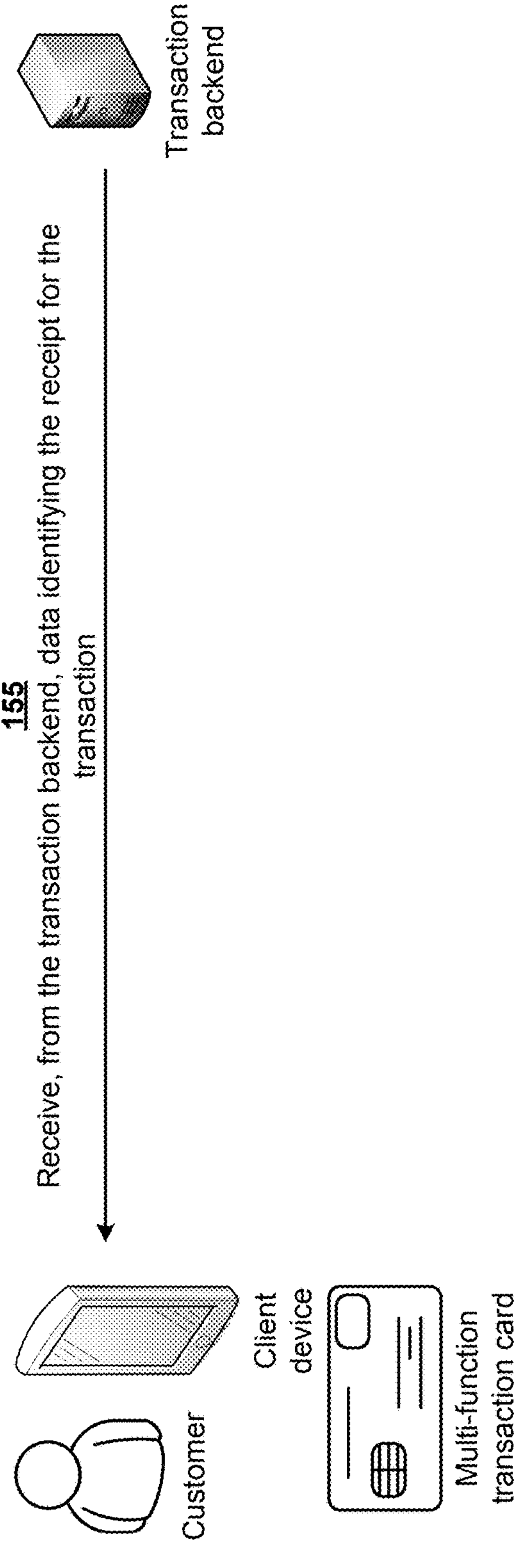
Figure 1F:

As shown in FIG. 1F, and by reference number 155, the client device associated with the customer may receive, from the transaction backend associated with the quick payment program, data identifying the receipt for the transaction. The client device associated with the customer may transmit the receipt to a multi-function transaction card associated with the customer. The receipt may identify the items associated with the transactions, the total cost for the transaction, item data associated with items included in the transaction, the merchant associated with the transaction, the customer associated with the transaction, the date the transaction was completed, and/or the like. As explained above, the receipt may enable the customer to exit the store.

In some implementations, the receipt may include a signature (e.g., a digital signature) indicating that the transaction has been completed for the items placed in the shopping cart of the customer. In some implementations, the receipt may be stored by the client device associated with the customer and/or by the multi-function transaction card associated with the customer.

Figure 1G:
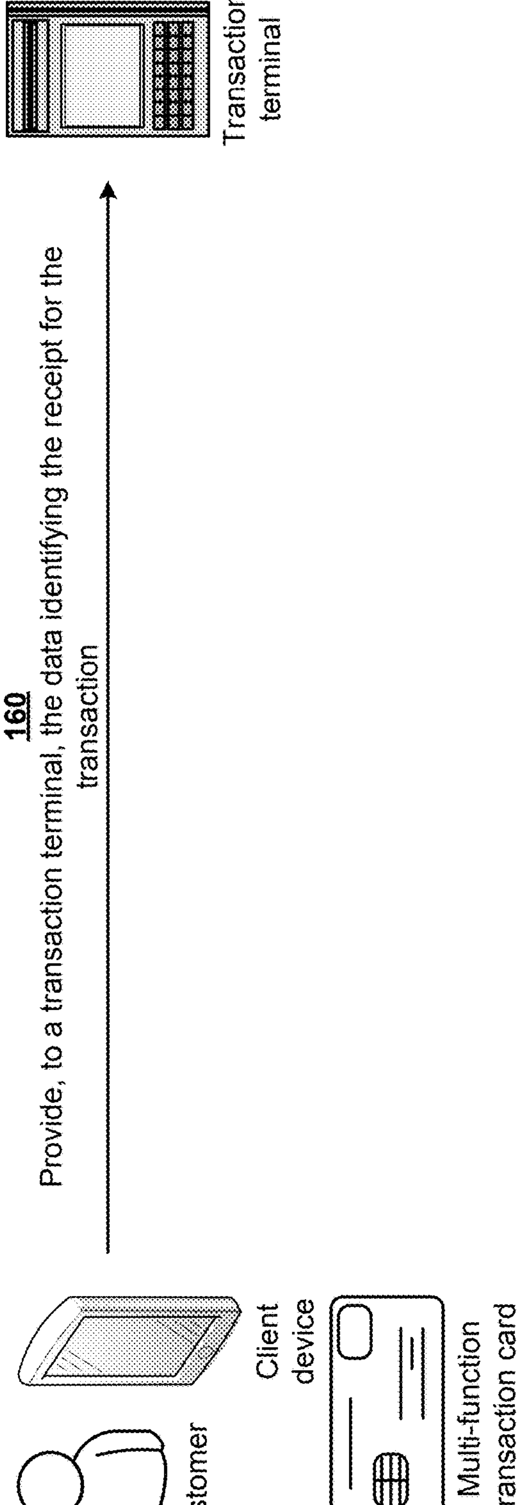

As shown in FIG. 1G, and by reference number 160, the client device may provide, to a transaction terminal associated with the merchant involved in the transaction, the data identifying the receipt for the transaction. In some implementations, the multi-function transaction card may provide, to the transaction terminal associated with the merchant involved in the transaction, the data identifying the receipt for the transaction. In some implementations, the client device and/or the multi-function transaction card may provide the first data, the second data, and/or the item data corresponding to the transaction with the data identifying the receipt for the transaction to the transaction terminal.

The client device and/or the multi-function transaction card may provide the first data, the second data, the item data corresponding to the transaction, and/or the data identifying the receipt for the transaction to the transaction terminal via a wireless connection. In some implementations, the client device and/or the multi-function transaction card may provide the first data, the second data, the item data corresponding to the transaction, and/or the data identifying the receipt for the transaction to the transaction terminal based on the location of the client device and/or the multi-function transaction card relative to the transaction terminal (e.g., the distance between the client device and the transaction terminal and/or the distance between the multi-function transaction card and the transaction terminal satisfying a threshold distance. In some implementations, the client device and/or the multi-function transaction card may provide the first data, the second data, the item data corresponding to the transaction, and/or the data identifying the receipt for the transaction to the transaction terminal based on entering a designated area.

In some implementations, the client device and/or the multi-function transaction card may provide the first data, the second data, the item data corresponding to the transaction, and/or the data identifying the receipt for the transaction to the transaction terminal in response to an input received from the customer. For example, the customer may provide an input to the client device (e.g., via the quick payment program application) which causes the client device to transmit the first data, the second data, the item data corresponding to the transaction, and/or the data identifying the receipt for the transaction to the transaction terminal. In some implementations, the customer may provide an input to the multi-function transaction card (e.g., via a sensor, such as a pressure sensors, a motion sensor, and/or the like, included in the multi-function transaction card) which causes the multi-function transaction card to transmit the first data, the second data, the item data corresponding to the transaction, and/or the data identifying the receipt for the transaction to the transaction terminal. Additionally, or alternatively, the input to the client device may cause the client device to cause the multi-function transaction card to transmit the first data, the second data, the item data corresponding to the transaction, and/or the data identifying the receipt for the transaction to the transaction terminal.

The transaction terminal, based on receiving the receipt from the client device and/or the multi-function transaction card, may perform one or more (or all) of the functions described above with respect to the transaction terminal. For example, the transaction terminal may verify the items in the shopping cart (e.g., using one or more transaction terminal sensors), communicate with one or more security devices to permit the customer to exit the store without being designated as an unauthorized customer, cause the shopping cart associated with the customer to exit the store (e.g., via autonomous control), enable the shopping cart associated with the customer to exit the store (e.g., via communication with a security device), and/or the like.

By completing the transaction via the transaction backend and providing a receipt related to the completed transaction to a transaction terminal, the quick payment program enables expedited checkout for a customer. For example, a customer would not have to wait in a checkout line, interact with the transaction terminal (other than providing the receipt and related data as described above), interact with employees of the merchant, and/or the like. As such, the quick payment program conserves computing resources and/or network resources that would have otherwise been used by the client device, the multi-function transaction card, the transaction terminal, and/or the transaction backend to receive the data related to the transaction, transmit the data to the transaction backend, complete the transaction, transmit information related to the completed transaction to the transaction terminal, transmit an indication of the completed transaction and/or a receipt for the completed transaction to the client device and/or the multi-function transaction card, and/or the like.

In this way, several different stages of the process for capturing item data and enabling expedited checkout for purchased items are automated via a multi-function transaction card, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a multi-function transaction card to capture item data and enable expedited checkout for purchased items in the manner described herein. Finally, the process for utilizing a multi-function transaction card to capture item data and enable expedited checkout for purchased items conserves computing resources, networking resources, human resources, and/or the like that would have otherwise been wasted in attempting to identify item-level data (e.g., SKU data) associated with the purchased items, scanning purchased items individually, waiting in a checkout line, and/or like.

As indicated above, FIGS. 1A-1G are provided merely as examples. Other examples may differ from what is described with regard to FIGS. 1A-1G. The number and arrangement of devices shown in FIGS. 1A-1G are provided as one or more examples. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more device) of FIGS. 1A-1G may perform one or more functions described as being performed by another set of devices of FIGS. 1A-1G.

Figure 2:
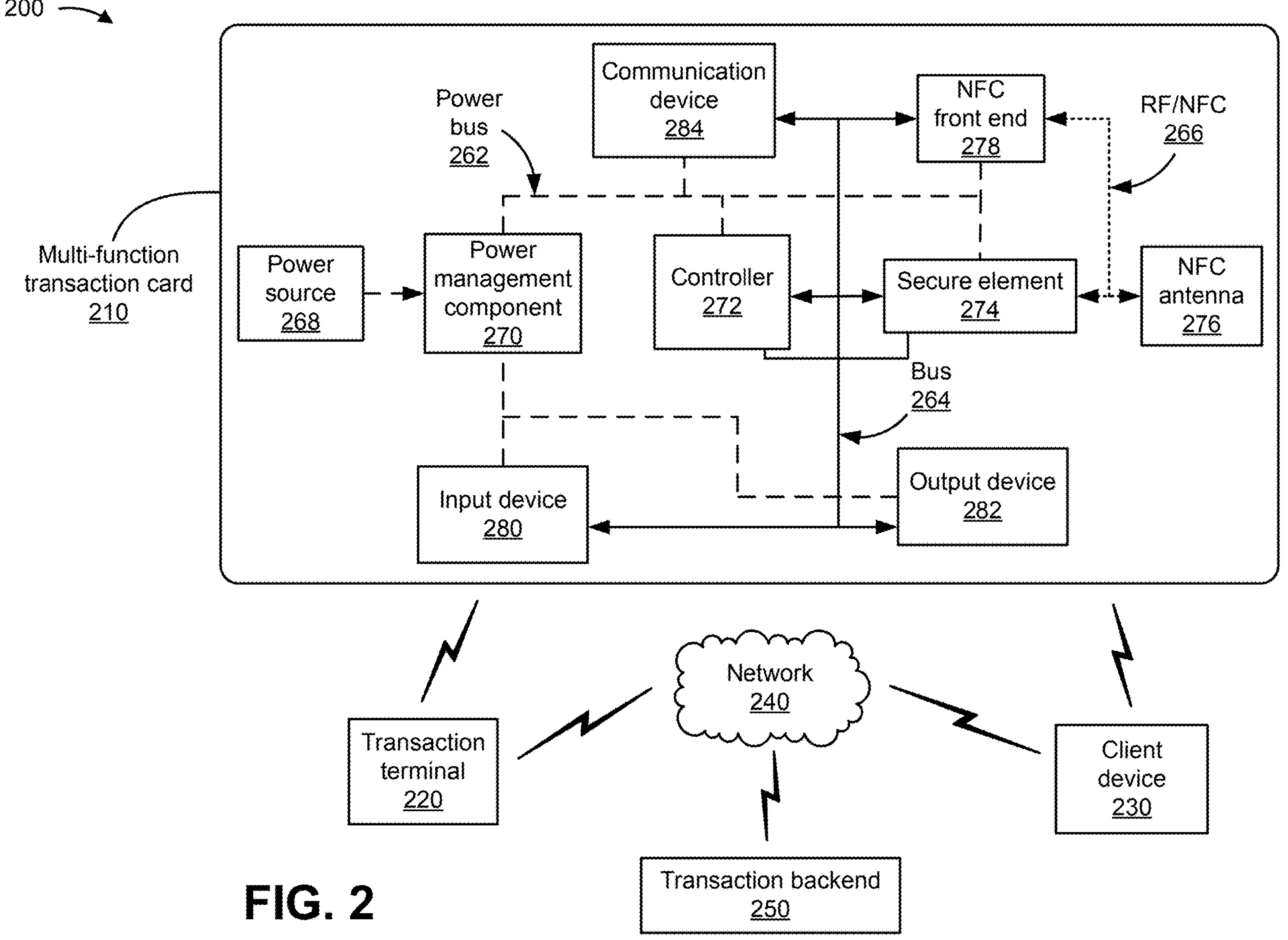
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a multi-functional transaction card 210, a transaction terminal 220, a client device 230, a network 240, and a transaction backend 250. Devices of environment 200 may interconnect via wired connections, wireless connections, or a combination of wired and wireless connections.

Multi-function transaction card 210 includes a transaction card capable of storing and/or communicating data for a point-of-sale (PoS) transaction with transaction terminal 220, and capable of receiving and/or storing data for a PoS transaction. For example, multi-function transaction card 210 may store or communicate data including account information (e.g., an account identifier, a cardholder identifier, etc.), expiration information of multi-function transaction card 210, banking information, transaction information (e.g., a payment token), and/or the like. For example, to store or communicate the data, multi-function transaction card 210 may include a magnetic stripe and/or an integrated circuit (IC) chip (e.g., an EMV chip and/or the like).

In some implementations, multi-function transaction card 210 may include a card body in or on which various components are embedded. In some implementations, multi-function transaction card 210 may include an antenna to communicate data associated with transaction terminal 220. The antenna may be a passive radio frequency (RF) antenna, an active RF antenna, and/or a battery-assisted RF antenna. In some implementations, multi-function transaction card 210 may be a smart transaction card, capable of communicating wirelessly (e.g., via Bluetooth, Bluetooth low energy (BLE), near-field communication (NFC), and/or the like) with a computing device, such as transaction terminal 220, a digital wallet, and/or another device. In some implementations, multi-function transaction card 210 may communicate with transaction terminal 220 to complete a transaction (e.g., based on being moved within communicative proximity of transaction terminal 220). In some implementations, multi-function transaction card 210 may include one or more components and/or one or more functionalities of transaction terminal 220.

Power bus 262 includes a component that permits the delivery of power to various components of multi-function transaction card 210. Bus 264 includes a component (e.g., a serial communication bus, such as a serial peripheral interface (SPI) bus, a universal asynchronous receiver-transmitter (UART)-based bus, a bus based on the inter-integrated circuit (I2C) protocol, and/or the like) that permits communication among various components of multi-function transaction card 210. RF/NFC 266 may include a communication link that permits data delivery between secure element 274, NFC antenna 276, and NFC front end 278.

Power source 268 includes one or more devices, internal to multi-function transaction card 210, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, multi-function transaction card 210 (e.g., controller 272, secure element 274, and/or NFC front end 278) may obtain power from power source 268 when multi-function transaction card 210 is to perform a transaction. In some aspects, multi-function transaction card 210 may include a single power source 268, which may supply power for performing a transaction and/or may supply power to one or more other components of multi-function transaction card 210 (e.g., a processor, a storage component, an input component, an output component, a communication interface, and/or the like). In some aspects, multi-function transaction card 210 may include multiple power sources 268. In some aspects, a single power source 268 may be dedicated to supplying power solely for performing a transaction, while other power sources 268 may supply power to other components of multi-function transaction card 210. In some implementations, multi-function transaction card 210 may include one or more solar cells and associated circuitry that enable various components of multi-function transaction card 210 to be powered by solar energy.

Power management component 270 includes one or more devices capable of controlling the delivery of power to various components of multi-function transaction card 210 and/or controlling charging of power source 268. For example, power management component 270 may include a switch, a gate, a controller, a regulator, a processing component, and/or the like. In some implementations, power management component 270 may include a bidirectional logic level shifter to control signals between controller 272 and secure element 274 (e.g., to couple or decouple controller 272 and secure element 274, to prevent signals from being passed between controller 272 and secure element 274, and/or the like). Additionally, or alternatively, power management component 270 may include a diode (e.g., an ideal diode) and/or a switch (e.g., a load switch) to control signals between power source 268 and secure element 274 (e.g., to couple or decouple power source 268 and secure element 274, to prevent signals from being passed between power source 268 and secure element 274, and/or the like).

Controller 272 includes one or more devices capable of receiving, generating, storing, processing, and/or providing information and/or instructions that assist with performing a transaction. For example, controller 272 may include a processor, such as processor 320 described below in connection with FIG. 3. Additionally, or alternatively, controller 272 may include memory, such as memory 330 described below in connection with FIG. 3. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller.

In some implementations, secure element 274 may host a personalized card application and a cryptographic key required to perform a financial transaction (e.g., with transaction terminal 220). In some implementations, secure element 274 may receive a cryptographic key required to perform a financial transaction, as described elsewhere herein. In some implementations, secure element 274 may store a credential associated with multi-function transaction card 210, such as a username, a password, biometric information, a token, a certificate for signing documents, and/or the like. In some implementations, secure element 274 may store a credential (e.g., a username, a password, biometric information, a token, a certificate for signing documents, and/or the like) associated with another transaction card, as described elsewhere herein.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card to process a payment, and/or the like). In some implementations, secure element 274 may include application logic configured to communicate with controller 272 (e.g., to cause controller 272 to communicate with a client device (e.g., client device 230) to facilitate online data authentication relating to a transaction, to receive instructions from controller 272 to initiate transaction processing, and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as transaction terminal 220, using an NFC protocol. NFC front end 278 may be communicatively coupled to secure element 274, and configured to obtain card data from secure element 274 and provide the card data to transaction terminal 220, as described elsewhere herein. In some implementations, NFC front end 278 may be configured to receive card data and provide the card data to secure element 274 for processing, as described elsewhere herein.

NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, multi-function transaction card 210 may include a transaction IC that includes an integrated circuit connecting secure element 274, NFC antenna 276, and/or one or more other components of multi-function transaction card 210. For example, the transaction IC may include secure element 274, NFC antenna 276, NFC front end 278, connection(s) between secure element 274, NFC antenna 276, and NFC front end 278, and/or the like.

Input device 280 includes one or more components that permit multi-function transaction card 210 to receive information, such as via user input (e.g., to initiate a transaction). For example, input device 280 may include an input component, such as input component 350 described below in connection with FIG. 3. For example, input device 280 may include an accelerometer, pushbutton(s), touch sensor(s), keypad input(s), and/or the like.

Output device 282 includes one or more components that permit multi-function transaction card 210 to provide output information (e.g., relating to transaction processing associated with transaction terminal 220). For example, output device 282 may include an output component, such as output component 360 described below in connection with FIG. 3. For example, output device 282 may include dot matrix display(s), one or more LEDs (e.g., printed organic LEDs), and/or the like.

Communication device 284 includes a transceiver-like component that enables multi-function transaction card 210 to communicate with other devices. For example, communication device 284 may include a communication interface, such as communication interface 370 described below in connection with FIG. 3. In some implementations, communication device 284 may include a Bluetooth communication interface, a BLE communication interface, and/or the like. In some implementations, communication device 284 may be included in, or integrated with, controller 272.

Transaction terminal 220 includes one or more devices to facilitate processing a transaction via multi-function transaction card 210. Transaction terminal 220 may include a PoS terminal, a security access terminal, an ATM terminal, and/or the like. Transaction terminal 220 may include one or more input devices and/or output devices to facilitate obtaining transaction card data from multi-function transaction card 210, and/or interaction or authorization from a cardholder of multi-function transaction card 210. Example input devices of transaction terminal 220 may include a number keypad, a touchscreen, a magnetic stripe reader, a chip reader, and/or an RF signal reader. A magnetic stripe reader of transaction terminal 220 may receive transaction card data as a magnetic stripe of multi-function transaction card 210 is swiped along the magnetic stripe reader. A chip reader of transaction terminal 220 may receive transaction card data from an IC chip (e.g., an EMV chip) of multi-function transaction card 210 when the chip is placed in contact with the chip reader. An RF signal reader of transaction terminal 220 may enable contactless transactions from multi-function transaction card 210 by obtaining transaction card data wirelessly from multi-function transaction card 210 as multi-function transaction card 210 comes within a range of transaction terminal 220 at which the RF signal reader may detect an RF signal from an RF antenna of multi-function transaction card 210. Example output devices of transaction terminal 220 may include a display device, a speaker, a printer, and/or the like.

The transaction terminal 220 may include one or more devices capable of receiving, generating, storing, processing, and/or providing information, such as transaction data information described herein. For example, the transaction terminal 220 may include an automated teller machine (ATM) device, a point of sale (PoS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A PoS device may include an electronic device used to process transaction card payments at retail locations associated with a merchant. The PoS device may read information from a multi-function transaction card (e.g., a credit card, a debit card, a gift card, and/or the like), and may determine whether there are sufficient funds in an account associated with the multi-function transaction card for a transaction (e.g., by communicating with a transaction backend). The PoS device may cause a transfer funds from the account associated with the multi-function transaction card to an account of the merchant (e.g., by communicating with the transaction backend) and may record the transaction. A kiosk device may include a computer terminal featuring specialized hardware and software that provides access to information and/or applications for communication, transactions, commerce, entertainment, education, and/or the like.

Client device 230 includes one or more devices capable of receiving, generating, storing, processing, and/or providing information associated with multi-function transaction card 210. For example, client device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, client device 230 may include application logic capable of facilitating communications between transaction terminal 220 and multi-function transaction card 210.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with banks and/or transaction card associations that authorize transactions and/or facilitate a transfer of funds or payments between an account of a cardholder of multi-function transaction card 210 and an account of an individual or business of transaction terminal 220. For example, transaction backend 250 may include one or more devices of one or more issuing banks associated with a cardholder of multi-function transaction card 210, one or more devices of one or more acquiring banks (or merchant banks) associated with transaction terminal 220, and/or one or more devices associated with one or more card associations (e.g., VISA®, MASTERCARD®, and/or the like) associated with multi-function transaction card 210. Accordingly, in response to receiving transaction card data associated with multi-function transaction card 210 from transaction terminal 220, various banking institutions and/or card associations of transaction backend 250 may communicate to authorize the transaction and/or transfer funds between the accounts associated with multi-function transaction card 210 and/or transaction terminal 220.

In some implementations, transaction backend 250 may include one or more devices associated with security that may provide or deny authorization associated with transactions. For example, transaction backend 250 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with multi-function transaction card 210 and/or provided by transaction terminal 220.

In some implementations, transaction backend 250 may include one or more devices associated with a rewards program relating to multi-function transaction card 210 and/or an entity (e.g., a bank, a merchant, a service provider, a vendor, and/or the like) associated with multi-function transaction card 210 and/or transaction terminal 220. For example, transaction backend 250 may authorize the earning and/or redemption of rewards (e.g., rewards points associated with multi-function transaction card 210, cash rewards, client loyalty rewards associated with an entity associated with transaction terminal 220, and/or the like) based on a transaction processed by transaction terminal 220 with multi-function transaction card 210.

The transaction backend 250 may include one or more devices associated with financial institutions (e.g., banks, credit unions, and/or the like) and/or transaction card associations that authorize the transaction and/or facilitate a transfer of funds or payments between an account of a cardholder of a transaction card (e.g., the multi-function transaction card) and an account of an individual or business (e.g., a merchant) of the transaction terminal. For example, the transaction backend 250 may include one or more devices of one or more issuing financial institutions associated with a cardholder (e.g., the customer) of the multi-function transaction card, one or more devices of one or more acquiring financial institutions (or merchant banks) associated with the transaction terminal, and/or one or more devices associated with one or more card associations (e.g., VISA®, MASTERCARD®, and/or the like) associated with the multi-function transaction card. Accordingly, based on receiving transaction card data associated with the multi-function transaction card from the transaction terminal, various financial institutions and/or card associations of the transaction backend 250 may communicate to authorize the transaction and/or transfer funds between the accounts associated with the multi-function transaction card and/or the transaction terminal.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
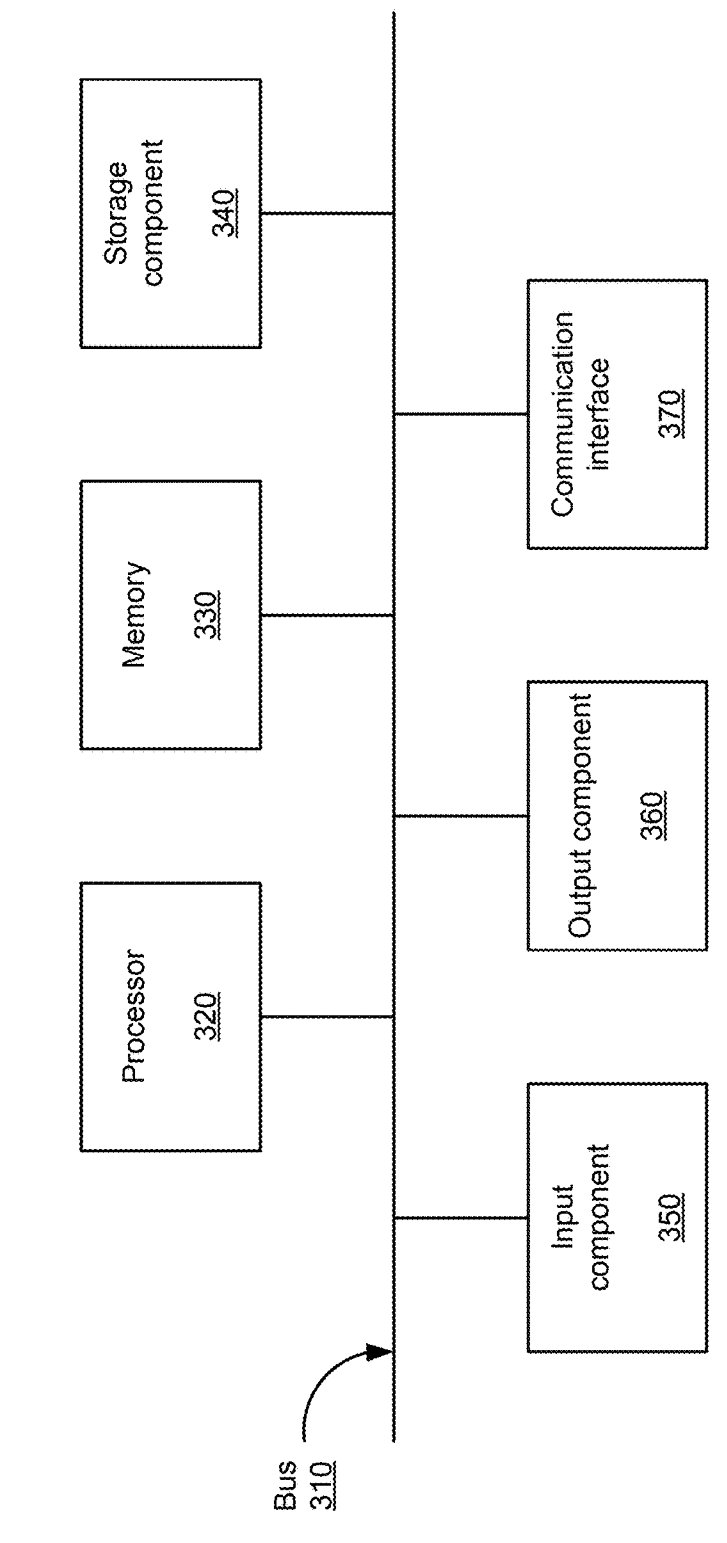
FIG. 3 is a diagram of example components of one or more devices of FIG. 2.

FIG. 3 is a diagram of example components of a device 300. Device 300 may correspond to multi-function transaction card 210, transaction terminal 220, client device 230, and/or transaction backend 250. In some implementations, multi-function transaction card 210, transaction terminal 220, client device 230, and/or transaction backend 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
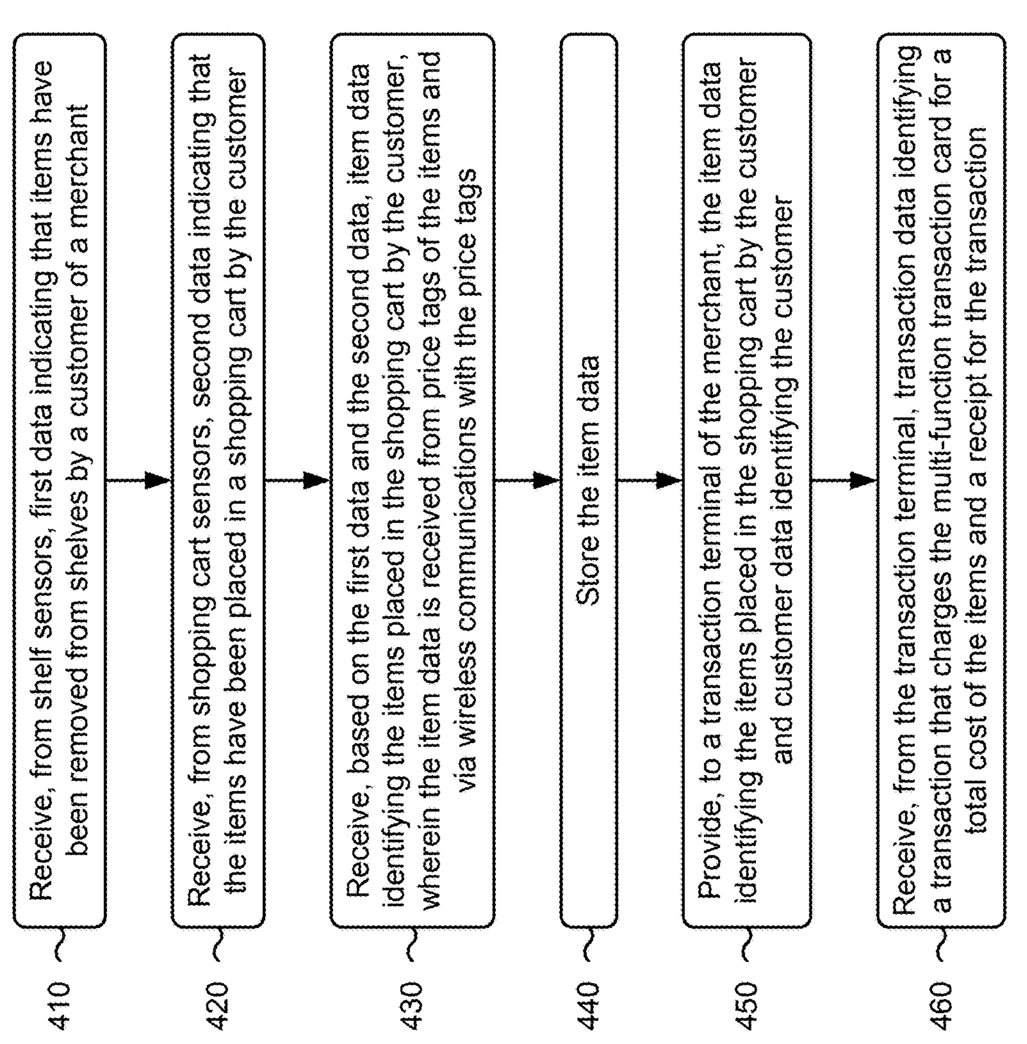
FIGS. 4-6 are flow charts of example processes for utilizing a multi-function transaction card to capture item data and enable expedited checkout for purchased items.

FIG. 4 is a flow chart of an example process 400 for utilizing a multi-function transaction card to capture item data and enable expedited checkout for purchased items. In some implementations, one or more process blocks of FIG. 4 may be performed by a device (e.g., multi-function transaction card 210). In some implementations, one or more process blocks of FIG. 4 may be performed by another device or a group of devices separate from or including the device, such as a client device (e.g., client device 230).

As shown in FIG. 4, process 400 may include receiving, from shelf sensors, first data indicating that items have been removed from shelves by a customer of a merchant (block 410). For example, the device (e.g., using processor 320, communication interface 370, controller 272, communication device 284, and/or the like) may receive, from shelf sensors, first data indicating that items have been removed from shelves by a customer of a merchant, as described above.

As further shown in FIG. 4, process 400 may include receiving, from shopping cart sensors, second data indicating that the items have been placed in a shopping cart by the customer (block 420). For example, the device (e.g., using processor 320, communication interface 370, controller 272, communication device 284, and/or the like) may receive, from shopping cart sensors, second data indicating that the items have been placed in a shopping cart by the customer, as described above.

As further shown in FIG. 4, process 400 may include receiving, based on the first data and the second data, item data identifying the items placed in the shopping cart by the customer, wherein the item data is received from price tags of the items and via wireless communications with the price tags (block 430). For example, the device (e.g., using processor 320, input component 350, communication interface 370, controller 272, communication device 284, input device 280, and/or the like) may receive, based on the first data and the second data, item data identifying the items placed in the shopping cart by the customer, as described above. In some implementations, the item data may be received from price tags of the items and via wireless communications with the price tags.

As further shown in FIG. 4, process 400 may include storing the item data (block 440). For example, the device (e.g., using processor 320, storage component 340, controller 272, communication device 284, and/or the like) may store the item data, as described above.

As further shown in FIG. 4, process 400 may include providing, to a transaction terminal of the merchant, the item data identifying the items placed in the shopping cart by the customer and customer data identifying the customer (block 450). For example, the device (e.g., using processor 320, memory 330, communication interface 370, controller 272, communication device 284, and/or the like) may provide, to a transaction terminal of the merchant, the item data identifying the items placed in the shopping cart by the customer and customer data identifying the customer, as described above.

As further shown in FIG. 4, process 400 may include receiving, from the transaction terminal, transaction data identifying a transaction that charges the multi-function transaction card for a total cost of the items and a receipt for the transaction (block 460). For example, the device (e.g., using processor 320, storage component 340, communication interface 370, controller 272, communication device 284, and/or the like) may receive, from the transaction terminal, transaction data identifying a transaction that charges the multi-function transaction card for a total cost of the items and a receipt for the transaction, as described above.

Process 400 may include additional implementations, such as any single implementation or any combination of implementations described below and/or in connection with one or more other processes described elsewhere herein.

In a first implementation, the item data may be received based on the shelf sensors wirelessly communicating the first data to the device, and the shopping cart sensors wirelessly communicating the second data to the device.

In a second implementation, alone or in combination with the first implementation, process 400 may include causing the transaction terminal of the merchant to print the receipt for the transaction.

In a third implementation, alone or in combination with one or more of the first and second implementations, the transaction data may cause the transaction terminal to inform one or more security devices of the merchant about completion of the transaction and to enable the customer to exit a store of the merchant.

In a fourth implementation, alone or in combination with one or more of the first through third implementations, the receipt may enable the customer to exit a store of the merchant.

In a fifth implementation, alone or in combination with one or more of the first through fourth implementations, the shopping cart may be autonomous and the transaction data may cause the shopping cart to exit a store of the merchant and travel to a vehicle of the customer.

In a sixth implementation, alone or in combination with one or more of the first through fifth implementations, the item data may include data identifying manufacturers of the items, descriptions of the items, materials of the items, sizes of the items, colors of the items, packages associated with the items, whether the items are associated with an age restriction, or warranty terms associated with the items.

In a seventh implementation, alone or in combination with one or more of the first through sixth implementations, process 400 includes determining that at least one of the first data, the second data, or the third data indicates an item associated with an age restriction; and outputting information that indicates whether a cardholder associated with the multi-function transaction card satisfies the age restriction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
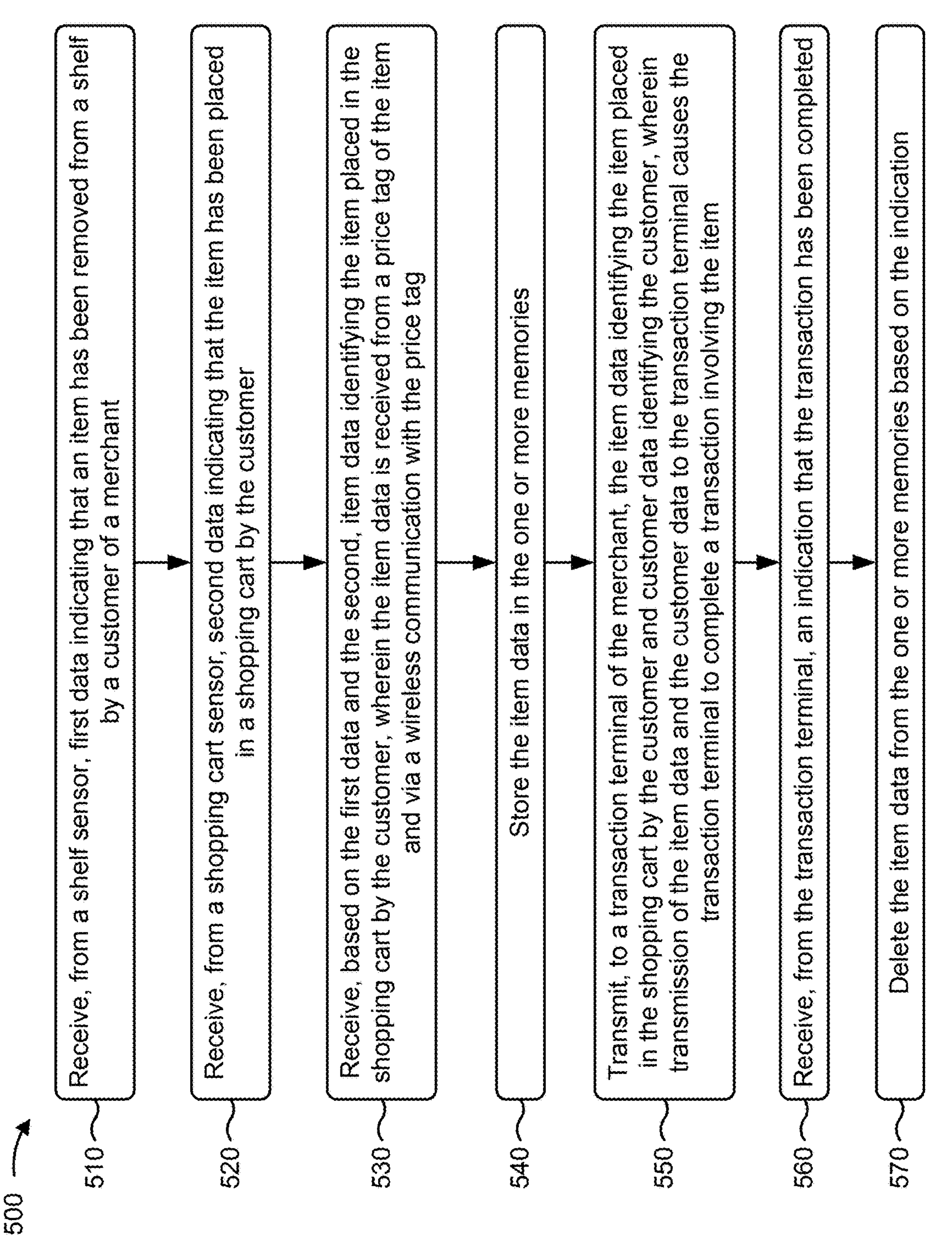

FIG. 5 is a flow chart of an example process 500 for utilizing a multi-function transaction card to capture item data and enable expedited checkout for purchased items. In some implementations, one or more process blocks of FIG. 5 may be performed by a device (e.g., multi-function transaction card 210). In some implementations, one or more process blocks of FIG. 5 may be performed by another device or a group of devices separate from or including the device, such as a client device (e.g., client device 230).

As shown in FIG. 5, process 500 may include receiving, from a shelf sensor, first data indicating that an item has been removed from a shelf by a customer of a merchant (block 510). For example, the device (e.g., using processor 320, communication interface 370, controller 272, communication device 284, and/or the like) may receive, from a shelf sensor, first data indicating that an item has been removed from a shelf by a customer of a merchant, as described above.

As further shown in FIG. 5, process 500 may include receiving, from a shopping cart sensor, second data indicating that the item has been placed in a shopping cart by the customer (block 520). For example, the device (e.g., using processor 320, input component 350, output component 360, communication interface 370, controller 272, communication device 284, output device 282, and/or the like) may receive, from a shopping cart sensor, second data indicating that the item has been placed in a shopping cart by the customer, as described above.

As further shown in FIG. 5, process 500 may include receiving, based on the first data and the second, item data identifying the item placed in the shopping cart by the customer, wherein the item data is received from a price tag of the item and via a wireless communication with the price tag (block 530). For example, the device (e.g., using processor 320, memory 330, communication interface 370, controller 272, communication device 284, and/or the like) may receive, based on the first data and the second, item data identifying the item placed in the shopping cart by the customer, as described above. In some implementations, the item data may be received from a price tag of the item and via a wireless communication with the price tag.

As further shown in FIG. 5, process 500 may include storing the item data in the one or more memories (block 540). For example, the device (e.g., using processor 320, storage component 340, controller 272, secure element 274, and/or the like) may store the item data in the one or more memories, as described above.

As further shown in FIG. 5, process 500 may include transmitting, to a transaction terminal of the merchant, the item data identifying the item placed in the shopping cart by the customer and customer data identifying the customer, wherein transmission of the item data and the customer data to the transaction terminal causes the transaction terminal to complete a transaction involving the item (block 550). For example, the device (e.g., using processor 320, memory 330, storage component 340, communication interface 370, controller 272, communication device 284, and/or the like) may transmit, to a transaction terminal of the merchant, the item data identifying the item placed in the shopping cart by the customer and customer data identifying the customer, as described above. In some implementations, transmission of the item data and the customer data to the transaction terminal may cause the transaction terminal to complete a transaction involving the item.

As further shown in FIG. 5, process 500 may include receiving, from the transaction terminal, an indication that the transaction has been completed (block 560). For example, the device (e.g., using processor 320, communication interface 370, controller 272, communication device 284, and/or the like) may receive, from the transaction terminal, an indication that the transaction has been completed, as described above.

As further shown in FIG. 5, process 500 may include deleting the item data from the one or more memories based on the indication (block 570). For example, the device (e.g., using processor 320, memory 330, storage component 340, controller 272, communication device 284, secure element 274, and/or the like) may delete the item data from the one or more memories based on the indication, as described above.

Process 500 may include additional implementations, such as any single implementation or any combination of implementations described below and/or in connection with one or more other processes described elsewhere herein.

In a first implementation, completion of the transaction may cause a discount to be applied to a cost of the item, or reward points to be applied to the multi-function transaction card.

In a second implementation, alone or in combination with the first implementation, completion of the transaction may cause generation of a promotion for other items that are related to the item, or a promotion for the customer based on spending patterns associated with the item data.

In a third implementation, alone or in combination with one or more of the first and second implementations, process 500 may include providing, to a transaction server device and via a client device, the item data identifying the item placed in the shopping cart by the customer and the customer data identifying the customer, based on the customer joining a quick payment program.

In a fourth implementation, alone or in combination with one or more of the first through third implementations, the item data may include data identifying a manufacturer of the item, a description of the item, a material of the item, a size of the item, a color of the item, a package associated with the item, or warranty terms associated with the item.

In a fifth implementation, alone or in combination with one or more of the first through fourth implementations, completion of the transaction may cause generation of a rebate for a cost of the item.

In a sixth implementation, alone or in combination with one or more of the first through fifth implementations, the indication that the transaction has been completed may be received from a transaction server device that deducts a cost of the item from the multi-function transaction card and credits the transaction terminal with the cost of the item.

In a seventh implementation, alone or in combination with one or more of the first through sixth implementations, process 500 may include determining that the customer has opted in to a fundraiser supported by the merchant; and providing approval to transfer funds from an account of the customer for the fundraiser in association with the transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
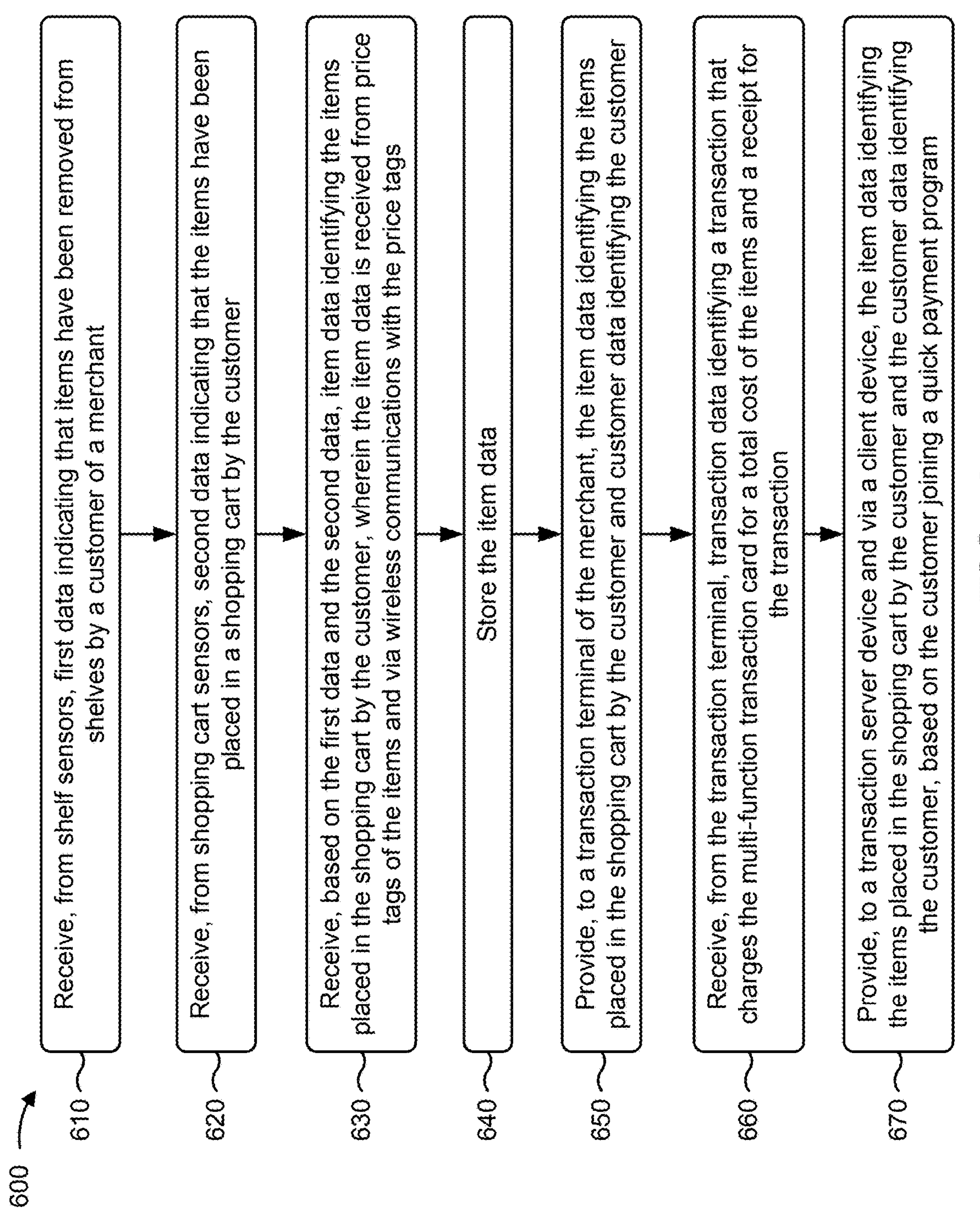

FIG. 6 is a flow chart of an example process 600 for utilizing a multi-function transaction card to capture item data and enable expedited checkout for purchased items. In some implementations, one or more process blocks of FIG. 6 may be performed by a device (e.g., multi-function transaction card 210). In some implementations, one or more process blocks of FIG. 6 may be performed by another device or a group of devices separate from or including the device, such as a client device (e.g., client device 230).

As shown in FIG. 6, process 600 may include receiving, from shelf sensors, first data indicating that items have been removed from shelves by a customer of a merchant (block 610). For example, the device (e.g., using processor 320, communication interface 370, controller 272, communication device 284, and/or the like) may receive, from shelf sensors, first data indicating that items have been removed from shelves by a customer of a merchant, as described above.

As further shown in FIG. 6, process 600 may include receiving, from shopping cart sensors, second data indicating that the items have been placed in a shopping cart by the customer (block 620). For example, the device (e.g., using processor 320, input component 350, communication interface 370, controller 272, communication device 284, input device 280, and/or the like) may receive, from shopping cart sensors, second data indicating that the items have been placed in a shopping cart by the customer, as described above.

As further shown in FIG. 6, process 600 may include receiving, based on the first data and the second data, item data identifying the items placed in the shopping cart by the customer, wherein the item data is received from price tags of the items and via wireless communications with the price tags (block 630). For example, the device (e.g., using processor 320, memory 330, communication interface 370, controller 272, secure element 274, communication device 284, and/or the like) may receive, based on the first data and the second data, item data identifying the items placed in the shopping cart by the customer, as described above. In some implementations, the item data may be received from price tags of the items and via wireless communications with the price tags.

As further shown in FIG. 6, process 600 may include storing the item data (block 640). For example, the device (e.g., using processor 320, storage component 340, controller 272, communication device 284, and/or the like) may store the item data, as described above.

As further shown in FIG. 6, process 600 may include providing, to a transaction terminal of the merchant, the item data identifying the items placed in the shopping cart by the customer and customer data identifying the customer (block 650). For example, the device (e.g., using processor 320, memory 330, communication interface 370, controller 272, communication device 284, and/or the like) may provide, to a transaction terminal of the merchant, the item data identifying the items placed in the shopping cart by the customer and customer data identifying the customer, as described above.

As further shown in FIG. 6, process 600 may include receiving, from the transaction terminal, transaction data identifying a transaction that charges the multi-function transaction card for a total cost of the items and a receipt for the transaction (block 660). For example, the device (e.g., using processor 320, communication interface 370, controller 272, communication device 284, and/or the like) may receive, from the transaction terminal, transaction data identifying a transaction that charges the multi-function transaction card for a total cost of the items and a receipt for the transaction, as described above.

As further shown in FIG. 6, process 600 may include providing, to a transaction server device and via a client device, the item data identifying the items placed in the shopping cart by the customer and the customer data identifying the customer, based on the customer joining a quick payment program (block 670). For example, the device (e.g., using processor 320, storage component 340, communication interface 370, controller 272, communication device 284, and/or the like) may provide, to a transaction server device and via a client device, the item data identifying the items placed in the shopping cart by the customer and the customer data identifying the customer, based on the customer joining a quick payment program, as described above.

Process 600 may include additional implementations, such as any single implementation or any combination of implementations described below and/or in connection with one or more other processes described elsewhere herein.

In a first implementation, the transaction data may cause the transaction terminal to inform one or more security devices of the merchant about completion of the transaction and to enable the customer to exit a store of the merchant.

In a second implementation, alone or in combination with the first implementation, the transaction data may cause a discount to be applied to the total cost of the items, or reward points to be applied to the multi-function transaction card.

In a third implementation, alone or in combination with one or more of the first and second implementations, the transaction data may cause generation of a promotion for other items that are related to the items, or a promotion for the customer based on spending patterns associated with the item data.

In a fourth implementation, alone or in combination with one or more of the first through third implementations, the shopping cart may be autonomous and the transaction data may cause the shopping cart to exit a store of the merchant and travel to a vehicle of the customer.

In a fifth implementation, alone or in combination with one or more of the first through fourth implementations, the transaction data may cause generation of a rebate for the total cost of the items.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:

one or more memories; and one or more processors, coupled to the one or more memories, configured to:

receive, from a first sensor, first data associated with one or more items being removed from one or more shelves, wherein the first device is a processor of a transaction card of a user;

receive, from a second sensor, second data associated with the one or more items being placed in a carrier;

receive, from the one or more items, third data associated with identifying the one or more items;

provide, to a second device, the third data and fourth data, wherein the fourth data identifies user information associated with the first device; and facilitate authentication associated with a transaction related to the one or more items.

2. The first device of claim 1, wherein the one or more processors, to facilitate the authentication, are configured to:

cause a secure element of the first device to communicate with a controller of the first device to facilitate the authentication.

3. The first device of claim 1, wherein the first device facilitates the authentication based on communicating with a third device associated with the user.

4. The first device of claim 1, wherein the one or more processors are further configured to:

provide, to a third device, the third data and the fourth data, wherein the third device is associated with a payment program;

receive, from the third device, data identifying a receipt for a transaction; and provide, to the second device, the data identifying the receipt.

5. The first device of claim 1, wherein transaction data associated with the transaction causes one or more security devices, associated with an establishment related to the one or more items, to be informed.

6. The first device of claim 1, wherein the third data is received from one or more price tags associated with the one or more items.

7. The first device of claim 1, wherein the one or more processors are further configured to:

provide an indication that the third data has been received.

8. A non-transitory computer-readable medium storing a set of instructions, the set of instructions comprising:

one or more instructions that, when executed by one or more processors of a first device, cause the first device to:

receive, from a first sensor, first data associated with one or more items being removed from one or more shelves, wherein the first device is a processor of a transaction card of a user;

receive, from a second sensor, second data associated with the one or more items being placed in a carrier;

receive, from the one or more items, third data associated with identifying the one or more items;

provide, to a second device, the third data and fourth data, wherein the fourth data identifies user information associated with the first device; and facilitate authentication associated with a transaction related to the one or more items.

9. The non-transitory computer-readable medium of claim 8, wherein the one or more instructions, that cause the first device to facilitate the authentication, cause the first device to:

cause a secure element of the first device to communicate with a controller of the first device to facilitate the authentication.

10. The non-transitory computer-readable medium of claim 8, wherein the first device facilitates the authentication based on communicating with a third device associated with the user.

11. The non-transitory computer-readable medium of claim 8, wherein the one or more instructions further cause the first device to:

provide, to a third device, the third data and the fourth data, wherein the third device is associated with a payment program;

receive, from the third device, data identifying a receipt for a transaction; and provide, to the second device, the data identifying the receipt.

12. The non-transitory computer-readable medium of claim 8, wherein transaction data associated with the transaction causes one or more security devices, associated with an establishment related to the one or more items, to be informed.

13. The non-transitory computer-readable medium of claim 8, wherein the third data is received from one or more price tags associated with the one or more items.

14. The non-transitory computer-readable medium of claim 8, wherein the one or more instructions further cause the first device to:

provide an indication that the third data has been received.

15. A method, comprising:

receiving, by a first device and from a first sensor, first data associated with one or more items being removed from one or more shelves, wherein the first device is a processor of a transaction card of a user;

receiving, by the first device, and from a second sensor, second data associated with the one or more items being placed;

receiving, by the first device, and from the one or more items, third data associated with identifying the one or more items in a carrier;

providing, by the first device, and to a second device, the third data and fourth data, wherein the fourth data identifies user information associated with the first device; and facilitating, by the first device, authentication associated with a transaction associated with the one or more items.

16. The method of claim 15, wherein facilitating the authentication comprises:

causing a secure element of the first device to communicate with a controller of the first device to facilitate the authentication.

17. The method of claim 15, wherein the first device facilitates the authentication based on communicating with a third device associated with the user.

18. The method of claim 15, further comprising:

providing, to a third device, the third data and the fourth data, wherein the third device is associated with a payment program;

receiving, from the third device, data identifying a receipt for a transaction; and providing, to the second device, the data identifying the receipt.

19. The method of claim 15, wherein transaction data associated with the transaction causes one or more security devices, associated with an establishment related to the one or more items, to be informed.

20. The method of claim 15, wherein the third data is received from one or more price tags associated with the one or more items.

* * * * *